United States Patent
Inoue et al.

(10) Patent No.: US 6,620,508 B2
(45) Date of Patent: Sep. 16, 2003

(54) OXIDE POWDER AND METHOD FOR PREPARING THE SAME, AND PRODUCT USING THE SAME

(75) Inventors: Akira Inoue, Mie (JP); Eiji Komai, Mie (JP); Takeyoshi Shibasaki, Mie (JP); Hirokuni Shirono, Mie (JP)

(73) Assignee: Nippon Aerosil Co., Ltd., Tokyo (JP)

( * ) Notice: Subject to any disclaimer, the term of this patent is extended or adjusted under 35 U.S.C. 154(b) by 0 days.

(21) Appl. No.: 09/937,581
(22) PCT Filed: Dec. 27, 2000
(86) PCT No.: PCT/JP00/09397
§ 371 (c)(1),
(2), (4) Date: Sep. 25, 2001
(87) PCT Pub. No.: WO01/55028
PCT Pub. Date: Aug. 2, 2001

(65) Prior Publication Data
US 2003/0022081 A1 Jan. 30, 2003

(30) Foreign Application Priority Data
Jan. 25, 2000 (JP) ......................................... 2000-015405

(51) Int. Cl.$^7$ ................................................. B32B 5/16
(52) U.S. Cl. .................... 428/403; 428/404; 423/611; 423/612; 423/613; 106/437; 106/442; 106/443; 106/444; 106/446
(58) Field of Search ................................. 428/403, 404; 106/437, 442, 443, 444, 446; 423/611, 612, 613

(56) References Cited

U.S. PATENT DOCUMENTS 5,064,690 A  11/1991  Sando et al. ................. 427/215

5,922,120 A  * 7/1999  Subramanian et al.

FOREIGN PATENT DOCUMENTS

| EP | 0963347 | * 12/1999 |
|---|---|---|
| JP | 62-288114 | * 12/1987 |
| JP | 64-079010 | * 3/1989 |
| JP | 2-253887 | 10/1990 |
| JP | 02-307806 | * 12/1990 |
| JP | 04-175219 | * 6/1992 |
| JP | 05-116930 | 5/1993 |
| JP | 5-170425 | 7/1993 |
| JP | 05-319808 | 12/1993 |
| JP | 07-247118 | 9/1995 |
| JP | 08-292587 | * 11/1996 |
| JP | 08-292597 | 11/1996 |
| JP | 10-152315 | 6/1998 |
| JP | 2000-6513 | 1/2000 |
| JP | 2000-141877 | 5/2000 |
| JP | 12-265161 | 9/2000 |

* cited by examiner

*Primary Examiner*—Leszek Kiliman
(74) *Attorney, Agent, or Firm*—Reed Smith LLP (57) ABSTRACT

Firstly, a powder matrix is kept in a fluent state, said powder matrix consisting of a first oxide having an absorbed water amount of 0.1 to 50%, an averaged particle diameter of 0.005 to 0.5 $\mu$m and a surface hydroxyl group number of 0.1 to 25 $\mu$mol/m$^2$. Then, one or both of a halide and an alkoxide including metal or semi-metal identical with or different from the metal or semi-metal constituting said first oxide is allowed to contact with said powder matrix kept in the fluent state, by means of an inert carrier gas, and then they are heated at a temperature of from 25 to 800° C., to thereby coat said powder matrix by a coating layer consisting of a second oxide. Further, a reaction by-product consisting of one or both of a hydrogen halide or an alcohol generated by said contacting is heated at a temperature of from 200 to 1000° C. within the inert carrier gas to thereby eliminate the reaction by-product.

34 Claims, 1 Drawing Sheet

OXIDE POWDER AND METHOD FOR PREPARING THE SAME, AND PRODUCT USING THE SAME

CROSS-REFERENCES TO RELATED APPLICATIONS

This application claims Paris Convention priority of Japanese Application No. 2000-015405 filed Jan. 25, 2000 and International Application No. PCT/JP00/09397 filed Dec. 27, 2000, the complete disclosure of which is/are hereby incorporated by reference.

TECHNICAL FIELD

The present invention relates to an oxide powder obtained by coating, for a powder matrix, the surface of each powder particle of the matrix comprising one or both of a metal oxide and a semi-metal oxide, or of a composite oxide or a mixed oxide prepared from the above metal and semi-metal oxides, with a coat of a metal oxide or semi-metal oxide identical with or different from the above metal or semi-metal oxide, a method for manufacturing thereof, and a product based on the use thereof.

BACKGROUND ART

As a conventional method for manufacturing such an oxide powder, a method for manufacturing composite particles whereby a powder matrix undergoes surface reformation through moisturization by a metal alkoxide so that the surface of its powder particle may receive a coating layer is disclosed (Japanese Patent Laid-Open No. Hei 5-170425). This method for manufacturing composite particles consists of uniformly dispersing silica particles (powder matrix) into an aqueous solution of a metal salt, the metal being chosen from the group comprising hydrolytic metals such as copper, iron, zirconium, aluminum, chromium and yttrium; forming a coat made of a metal compound on the surface of a silica particle through hydrolytic reaction; and thereby obtaining an oxide powder, each powder particle of which has its surface reformed.

The oxide powder obtained by the above method is highly pure, ensures a high quality because its coating layer hardly detach, and may be used in a wide field of applications as a catalyst, catalyst carrier or absorbent.

On the other hand, a slurry for CMP (Chemical Mechanical Polishing) comprising an abrasive composed of mixed crystal particles of silica and alumina is disclosed (Japanese Patent Laid-Open No. Hei 12-265161). This slurry is composed of silica and alumina mixed at a ratio (silica/alumina) of 1/9 to 1/1, and has a pH of 4 to 9.

The slurry having such a composition as described above, i.e., being composed of mixed crystal particles of silica and alumina as an abrasive agent, ensures a stable polishing activity because of its pH being stabilized close to neutrality, and a highly selective affinity between the insulating membrane and the metal membrane.

Moreover, the powder matrix here concerned, when it is incorporated in a printing sheet for a printer for an electronic device or in a printing material used as an OHP film, receives a further coat, i.e., an ink-receiving layer on the surface of its powder particle to enhance the visibility and adsorption of printed ink. Fine silica powder particles and alumina powder particles are used as a material of such an ink-receiving layer (for example, see Japanese Patent Laid-Open Nos. 2000-6513 and 2000-141877).

However, the method for manufacturing composite particles as disclosed in the above Japanese Patent Laid-Open No. Hei 5-170425 requires drying and pulverizing steps, which may raise the production cost. Further, with the aforementioned conventional methods for manufacturing composite particles, silica particles, after drying, tend to aggregate by capillary actions, which will require an additional step for pulverization. Therefore, the number of steps required for the manufacture of those particles will increase.

The oxide powder manufactured by the above conventional methods is used as an additive to a toner for electronic photography. The oxide powder comprising silica each powder particle of which has its surface reformed is added to a toner to provide the toner with fluency. In some cases, titania powder having its surface reformed may be added in combination with the silica powder, to further enhance charge stability and environment stability of the toner. However, there is a problem in that it is difficult to effectively control each activity of these powders. In addition, each powder may tend to detach from the surface of toner particles as a result of mixture.

The CPM slurry as disclosed in the Japanese Patent Laid-Open No. Hei 12-265161 may be disturbed in the dispersion of its particles if its pH shifts from neutrality, and thus its abrasive activity will be impaired.

Further, if silica powder is used as an ink-receiving layer as described in the Japanese Patent Laid-Open Nos. 2000-6513 and 2000-141877, although it certainly confers transparency to the printing material, it only thinly permits the adsorption of ink. Therefore, with the printing material incorporating such a silica powder, ink may spread on the surface of the printing material to blur the print, or the photo-resistance of the material may be impaired. If alumina powder is used instead as a material of the ink-receiving layer, adsorption of ink to the printing material may be improved but the transparency of the material will be impaired. In addition, if silica powder or alumina powder is used, the resulting slurry that is to serve as a material of the ink-receiving layer will become so unstable that it will become impossible to obtain a highly concentrated slurry from them.

The object of this invention is to provide an oxide powder and a method for manufacturing thereof, which comprises taking a powder matrix consisting of an oxide; and uniformly and at a low cost forming a coating layer consisting of an oxide identical with or different from the above oxide, on the surface of the powder matrix, and wherein both of the powder matrix and the coating layer can develop their respective physical and chemical characteristics satisfactorily.

A further object of this invention is to provide an oxide powder, a method for manufacturing thereof, and a product utilizing thereof whereby the oxide powder or the product is provided with or improved in:

fluency, charge controllability, charge stability, electric conductivity, mechanical strength, tackiness, dispersibility, dispersion stability, transparency, anti-precipitation, anti-blocking, rheologic performance, ultra-violet ray absorption, catalytic activity, inhibition of photocatalytic activity, abrasion activity, heat insulation, heat resistance, anion adsorption, etc.

DISCLOSURE OF INVENTION

The invention according to claim 1 provides a method for manufacturing an oxide powder comprising the steps of:

keeping a powder matrix in a fluent state, said powder matrix consisting of a first oxide composed of one or both of a metal oxide and a semi-metal oxide, or a composite or mixed oxide from those oxides, and having an absorbed water amount of 0.1 to 50%, an averaged particle diameter of 0.005 to 0.5 µm and a surface hydroxyl group number of 0.1 to 25 µmol/m$^2$;

contacting, one or both of a halide and an alkoxide including metal or semi-metal identical with or different from the metal or semi-metal constituting said first oxide, with said powder matrix kept in the fluent state, by means of an inert carrier gas, and then heating them at a temperature of from 25 to 800° C., to thereby coat said powder matrix by a coating layer consisting of a second oxide; and heating a reaction by-product consisting of one or both of a hydrogen halide or an alcohol generated by said contacting, at a temperature of from 200 to 1000° C. within the inert carrier gas to thereby eliminate the reaction by-product.

The invention according to claim 2 provides a method for manufacturing an oxide powder comprising the steps of:

keeping a powder matrix in a fluent state, said powder matrix consisting of a first oxide having an absorbed water amount of 0.1 to 50%, an averaged particle diameter of 0.005 to 0.5 µm and a surface hydroxyl group number of 0.1 to 25 µmol/m$^2$, contacting, a halide including metal or semi-metal identical with or different from the metal or semi-metal constituting said first oxide, with said powder matrix kept in the fluent state, by means of an inert carrier gas, and then heating them at a temperature of from 25 to 800° C., to thereby coat said powder matrix by a coating layer consisting of a second oxide; and heating a reaction by-product consisting of a hydrogen halide generated by said contacting, at a temperature of from 200 to 1000° C. within the atmosphere to thereby eliminate the reaction by-product.

The manufacturing methods as described in claim 1 or 2 can not only lower the cost required for the production of an oxide powder, but allows a coating layer to be uniformly formed on the surface of each particle of the powder matrix.

The powder matrix is preferably silica, alumina or titania, and the metal element included in said halide or said alkoxide is preferably one, or two or more of elements selected from the group consisting of transition elements of the 3A, 4A, 5A, 6A, 7A, 8, 1B and 2B families and typical elements of the 3B, 4B and 5B families in the periodic table.

Figure 2:
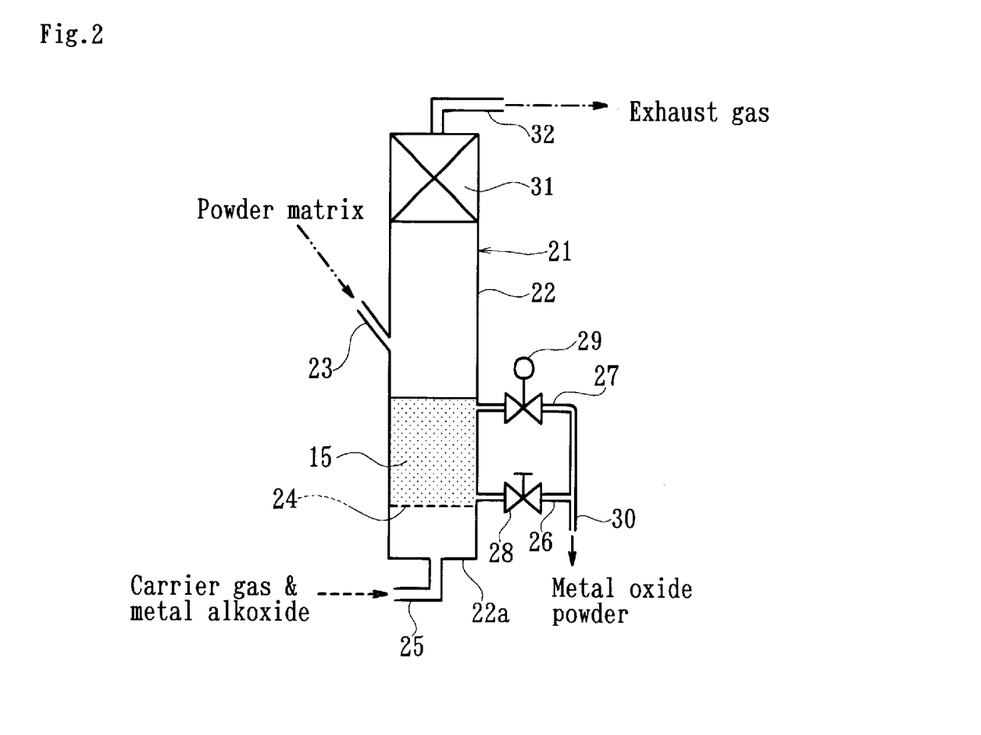
FIG. 2 is a schematic cross-section of a fluidized bed reaction apparatus for illustrating how the apparatus coats the powder matrix whose water content has been adjusted as above with a coating layer.

The invention according to claim 5 provides a method for manufacturing an oxide powder as described in any one of claims 1, 3 and 4 wherein, as shown in FIG. 2, said keeping step comprises the step of keeping, said powder matrix consisting of said first oxide having the absorbed water amount of 0.1 to 50% and the surface hydroxyl group number of 0.1 to 25 µmol/m$^2$, in the fluent state, by supplying said powder matrix to a fluidized bed reaction apparatus 21, and by circulating atmospheric air from the below through a baffle plate 24;

wherein said contacting step comprises the steps of adopting the inert carrier gas as a fluidizing gas, and circulating one or both of the halide and the alkoxide together with the carrier gas through the powder matrix kept in the fluent state through the baffle plate 24 to thereby coat said powder matrix by the coating layer consisting of the second oxide; and wherein said heating step comprises the step of circulating the carrier gas through the baffle plate 24, to thereby eliminate the reaction by-product and to thereby discharge said powder matrix coated by said coating layer, from the fluidized bed reaction apparatus 21.

The invention according to claim 6 provides a method for manufacturing an oxide powder as described in any one of claims 2 to 4 wherein, as shown in FIG. 2, said keeping step comprises the step of keeping, said powder matrix consisting of said first oxide having the absorbed water amount of 0.1 to 50% and the surface hydroxyl group number of 0.1 to 25 µmol/m$^2$, in the fluent state, by supplying said powder matrix to a fluidized bed reaction apparatus 21, and by circulating atmospheric air from the below through a baffle plate 24;

wherein said contacting step comprises the steps of adopting the inert carrier gas as a fluidizing gas, and circulating the halide together with the carrier gas through the powder matrix kept in the fluent state through the baffle plate 24 to thereby coat said powder matrix by the coating layer consisting of the second oxide; and wherein said heating step comprises the step of circulating atmospheric air through the baffle plate 24, to thereby eliminate the reaction by-product and to thereby discharge said powder matrix coated by said coating layer, from the fluidized bed reaction apparatus 21.

The manufacturing method as described in claim 5 or 6 makes it possible to manufacture, in a continuous manner, an oxide powder wherein a coating layer is uniformly formed on the surface of a powder matrix, to thereby further reduce the cost required for the production of an oxide powder.

In the case of analyzing elements of a population including the oxide powder manufactured by the above methods as constituent ingredients of the population, a relative dispersion among elements is within ±60%; and no more than one agglomerate of powder particles exists in 1000 powder particles of the population, or, in other words, only primary particles exist in every 1000 powder particles of the population, and no secondary particle exists in the same population.

The invention according to claim 8 provides an oxide powder having an averaged particle diameter of 0.006 to 0.5 µm, comprising:

a powder matrix consisting of a first oxide having an averaged particle diameter of 0.005 to 0.5 µm and composed of one or both of a metal oxide and a semi-metal oxide, or of a composite or mixed oxide from those oxides, and a coating layer coating the surface of said powder matrix, said coating layer consisting of a second oxide identical with or different from said first oxide, wherein said second oxide of said coating layer is chemically bonded to the surface of said first oxide of said powder matrix, and the surface of said first oxide of said powder matrix is uniformly coated by the coating layer by 60% or more.

The invention according to claim 9 provides an oxide powder as described in claim 8 wherein said powder matrix has an absorbed water amount of 0.1 to 50%, and a surface hydroxyl group number of 0.1 to 25 µmol/m$^2$, and wherein the coated amount by said coating layer is 0.1 to 10 times the surface hydroxyl group number.

The invention according to claim 10 provides an oxide powder as described in claim 8 or 9 wherein said powder matrix further comprises silica, alumina or titania, or is a composite oxide or a mixed oxide comprising at least silica, alumina or titania.

The invention according to claim 11 provides an oxide powder as described in any one of claims 8 to 10 wherein the metal element included in said second oxide of said coating layer is one or two or more of elements selected from the group consisting of transition elements of the 3A, 4A, 5A, 6A, 7A, 8, 1B and 2B families and typical elements of the 3B, 4B and 5B families in the periodic table.

The oxide powder as described in any one of claims 8 to 11 ensures the satisfactory development of the physical and chemical characteristics of the powder matrix and its coating layer. The physical and chemical characteristics may include those as described in (1) to (7).

(1) If the coating layer includes titania, and the oxide powder is used as an additive for a toner for electronic photography, the coating layer will provide the toner with fluency and charge stability at the same time.

(2) If the coating layer includes alumina, the coating layer will improve the abrasive activity of the oxide powder, and provide the oxide powder with a heat insulating activity and anion adsorbing activity.

(3) If the coating layer includes silica, the coating layer will provide the oxide powder with dispersion stability, and improve the fluency of the oxide powder.

(4) If the coating layer includes cerium oxide, the coating layer will improve the abrasive activity of the oxide powder. If this oxide powder is added to silicone rubber to be kneaded, it will provide the silicone rubber with heat resistance.

(5) If the coating layer includes iron oxide, the oxide powder will provide silicone rubber with heat resistance as in (4).

(6) If the coating layer includes stannic oxide and antimony oxide, the coating layer will provide the oxide powder with electric conductivity.

(7) If the powder matrix is titania, the coating layer will inhibit its photo-catalytic activity.

An oxide powder as described in any one of claims 8 to 11 is preferably provided with hydrophobicity, by surface reforming by one or both of a silane coupling agent and a silicone compound.

The silane coupling is preferably a coupling agent represented by the following formula (1):

$$X_{4-n}SiR_n \ldots \quad (1)$$

wherein X is any one of a hydroxyl group, an alkoxy group and a halogen atom, R is an alkyl group having 1 to 18 carbons, and n is an integer from 0 to 3.

The silane coupling agent may be a coupling agent as represented by the following formula (2):

$$R_3SiNHSiR_3 \ldots \quad (2)$$

wherein R is an alkyl group having 1 to 18 carbons.

The silicone compound is preferably represented by the following formula (3):

(3)

wherein the substitutional group represented by R' is any one of a methyl group and an ethyl group; R" is any one of a methyl group, an ethyl group and a hydrogen atom, or is an alkyl group including, as a part thereof, any one of a vinyl group, a phenyl group and an amino group; X is any one of a hydroxyl group, an alkoxy group, a halogen atom and an alkyl group; and m is an integer from 1 to 500.

An oxide powder as described in claim 16 preferably comprises the first oxide constituting a powder matrix which is a composite oxide or a mixed oxide including silica, or including at least silica; and the second oxide constituting the coating layer including a metal element. In this case, the second oxide constituting the coating layer is more preferably alumina, titania, zirconia or ceria. These oxide powders are utilized as a material for abrasives, or for forming the ink-receiving layer of printing materials. Such an abrasive is preferably incorporated in slurries for chemical/mechanical abrasion. The chemical/mechanical abrasive slurry containing such an oxide powder is highly stable after dispersion. If this slurry is used to abrade a material to be abraded, it is possible to abrade it at a high speed and give it a mirror-polished surface. Or, if such an oxide powder is used as a material for forming the ink-receiving layer of a printing material, the adsorbed amount of an anion-source compound to the oxide powder is preferably 150% or more than the adsorbed amount of the anion-source compound to the powder matrix.

The invention according to claim 21 provides an ink-receiving layer forming material containing an oxide powder as described in claim 20. This ink-receiving layer forming material is a stable slurry, although it contains a high concentration of an oxide powder. The content of the oxide powder in the ink-receiving layer forming material is preferably 5 to 30 wt %.

The invention according to claim 22 provides an ink-jet oriented print material consisting of, such as, paper, film, etc, which is obtained by coating and drying a slurry of said ink-receiving layer forming material of claim 21.

The ink-jet oriented print material as described in claim 22, if characters or images are printed on this material using an ink-jet printer, will ensure improved ink adsorption, and the transparency and photo-resistance of the print material. Further, the ink coat will not develop cracks nor cause blurs.

The invention according to claim 23 provides a toner oriented additive comprising said oxide powder as described in any one of claims 12 to 15 wherein said first oxide of said powder matrix is silica, and the second oxide of said coating layer is titania.

The toner oriented additive as described in claim 23 will improve the fluency and charge controllability of the toner.

The invention according to claim 24 provides a ultraviolet ray absorbing material comprising an oxide powder as described in any one of claims 8 to 11 wherein said first oxide of said powder matrix is titania, and said second oxide of said coating layer is any one of silica, alumina and iron oxide.

The ultraviolet ray absorbing material as described in claim 24 will not only improve the ultraviolet ray absorption of the product, but keep its own photo-catalytic activity inhibited.

The invention according to claim 25 provides an electrically conductive powder comprising an oxcide powder as described in any one of claims 8 to 11 wherein said first oxide of said powder matrix is silica, and said second oxide of said coating layer is titania, or antimony-doped stannic oxide.

The electrically conductive powder as described in claim 25, if it is used as a material of an electro-conductive coat, will improve the electro-conductivity of the coat.

BEST MODE FOR CARRYING OUT THE INVENTION

Next, the embodiments of this invention will be described.

An oxide powder of this invention comprises a powder matrix consisting of a first oxide having an average diameter of 0.005 to 0.5 µm, or preferably 0.005 to 0.3 µm, and a coating layer coating the surface of the powder matrix and consisting of a second oxide identical with or different from said first oxide. Here the average diameter of the powder matrix is limited to 0.005 to 0.5 µm. This is because, if the diameter in question is below 0.005 µm, oxides having such a small diameter will not be available because their production may not be achieved on a commercial basis and, even if they are produced, hardly available on account of their high price because they may be produced on a research basis. On the contrary, if the diameter exceeds 0.5 µm, it will be difficult to keep powder particles in a uniform fluidity or mixture while fluidizing or stirring the particles, and thus the uniformity of the coating layer will be impaired. Particularly, with an oxide powder each particle of which has an average diameter over 0.5 µm, production of stable products based on it will become difficult: a toner incorporating it will not present an improved fluidity; a slurry incorporating it will be unstable, if it is dispersed in water or polyvinyl alcohol; and other products will not show a satisfactory abrasive activity nor anion absorption. The oxide powder comprises powder particles each of which has an average diameter of 0.006 to 0.5 µm, preferably of 0.006 to 0.1 µm. This range of average diameter of powder particle of the oxide powder is based on the above average diameter of the powder matrix. Because the powder matrix and the oxide powder are a primary particle, their average diameter can be read from their respective photographic images taken with a TEM (Transmission Electron Microscope). The oxide powder comprises a powder matrix consisting of a first oxide; and a coating layer consisting of a second oxide chemically bonded on the surface of the first oxide. The surface of the powder matrix is uniformly coated with the coating layer by 60% or more, preferably 80% or more. Here, the uniform coating with the coating layer is limited to 60% or more. This is because, if the coating is achieved by less than 60%, the coating layer will not be able to develop its activity satisfactorily.

The absorbed water amount of the powder matrix is 0.1 to 50%, or preferably 0.5 to 10%; the surface hydroxyl group number of the powder matrix is 0.1 to 25 µmol/m$^2$, or preferably 1 to 20 µmol/m$^2$; and the coated amount of the powder matrix by the coating layer is 0.1 to 10 times the surface hydroxyl group number, or preferably 0.4 to 6 times. Here, the absorbed water amount of the powder matrix is limited to 0.1 to 50%. This is because, if it is below 0.1%, the coating layer of a second oxide which may be identical with or different from the powder matrix will not be formed satisfactorily on the surface of the powder matrix, and thus effects from the coating layer will not present satisfactorily in the face of the powder matrix, whereas, if it exceeds 50%, the powder matrix tends to aggregate so much that the coating layer formed on the surface of the powder matrix will not become uniform, and thus the advantage derivable from the coating layer will not manifest fully. For example, if the powder matrix is silica, and its absorbed water amount is put outside the range of 0.1 to 50%, each particle of the oxide powder will be intensely charged with negative electricity through friction, and thus the characteristic activity of the coating layer will not develop satisfactorily. Further, here the surface hydroxyl group number of the powder matrix is limited to 0.1 to 25 µmol/m$^2$. This is because, if it is below 0.1 µmol/m$^2$, the powder matrix will not absorb water adequately, and thus the coating layer will not be formed on the surface of the powder matrix satisfactorily, whereas, if it exceeds 25 µmol/cm$^2$, the powder matrix will tend to aggregate. Furthermore, here the coated amount of the powder matrix by the coating layer is limited to 0.1 to 10 times the surface hydroxyl group number. This is because, if it is below 0.1 time, the effects from the powder matrix will become so large that they will mask the effects from the coating layer, whereas, if it exceeds 10 times, the coating layer formed on the surface of the powder matrix will not be uniform, and thus the characteristic activity of the coating layer will not develop satisfactorily. The absorbed water amount of the powder matrix can be obtained by sampling about 1 g of a first oxide in a 1 g weighing bottle; heating it at 105° C. for two hours to dryness for weighing; and determining by calculation the percent (%) of the weight loss before and after the drying. The surface hydroxyl group number of the powder matrix can be obtained, as described in a silicone handbook, by Grignard method, Karl-Fischer method, or the lithium-aluminum method wherein a dried sample is mixed with lithium aluminum hydride to thereby cause hydrogen to evolve for measurement.

The form of the powder matrix may take includes the following (a) to (h):

(a) Metal oxides, (b) Semi-metal oxides, (c) Composite oxides comprising two or more metal oxides, (d) Composite oxides comprising two or more semi-metal oxides, (e) Mixed oxides obtained by mixing two or more metal oxides, (f) Mixed oxides obtained by mixing two or more semi-metal oxides, (g) Composite oxides comprising one or two or more metal oxides, and one or two or more semi-metal oxides, and (h) Mixed oxides obtained by mixing one or two or more metal oxides, and one or two or more semi-metal oxides.

The powder matrix preferably comprises silica (SiO$_2$), alumina (Al$_2$O$_3$) or titania (TiO$_2$), or is a composite oxide including at least silica, alumina or titania, or a mixed oxide obtained by mixing mechanically those oxides. These oxides may take any form selected from fumed compounds, moisturized compounds, minerals, hydroxides, etc. The second oxide constituting the coating layer is preferably one or two selected from the group consisting of transition elements of the 3A, 4A, 5A, 6A, 7A, 8, 1B, and 2B families and typical elements of the 3B, 4B and 5B families in the periodic table. More specifically, Y and Ce are selected from 3A family; Ti and Zr from 4A family; V from 5A family; Cr, Mo and W from 6A family; Mn from 7A family; Fe, Co and Ni from 8 family; Cu and Ag from 1B family; Zn from 2B family; Al and In from 3B family; Si and Sn from 4B family; and Sb from 5B family.

The oxide powder is provided with hydrophobicity, by surface reforming by one or both of a silane coupling agent and a silicone compound. The silane coupling agent is preferably represented by the following formula (1) or (2):

$$X_{4-n}SiR_n \ldots \quad (1)$$

wherein X is any one of a hydroxyl group, an alkoxy group and a halogen atom, R is an alkyl group having 1 to 18 carbons, and n is an integer from 0 to 3; and $$R_3SiNHSiR_3 \ldots \quad (2)$$

wherein R is an alkyl group having 1 to 18 carbons.

The silicone compound is preferably expressed by the following formula (3):

(3)

wherein the substitutional group represented by R' is any one of a methyl group and an ethyl group, R" is any one of a methyl group, an ethyl group and a hydrogen atom, or is an alkyl group including, as a part thereof, any one of a vinyl group, a phenyl group and an amino group, X is any one of a hydroxyl group, an alkoxy group, a halogen atom and an alkyl group, and m is an inter from 1 to 500.

The method for manufacturing the oxide powder having a composition as above will be described below.

Firstly, a powder matrix consisting of a first oxide having an absorbed water amount of 0.1 to 50%, an averaged particle diameter of 0.005 to 0.5 µm and a surface hydroxyl group number of 0.1 to 25 µmol/m² is kept in a fluent state. Then, one or both of a halide and an alkoxide including metal or semi-metal identical with or different from the metal or semi-metal constituting the first oxide is contacted with the powder matrix kept in the fluent state, by means of an inert carrier gas, and then they are heated at a temperature of from 25 to 800° C., preferably from 25 to 600° C., to thereby coat the powder matrix by a coating layer consisting of a second oxide. Further, a reaction by-product consisting of one or both of a hydrogen halide and an alcohol generated by the contacting is heated at a temperature of from 200 to 1000° C., preferably from 200 to 600° C. within the inert carrier gas to thereby eliminate the reaction product, that is, to submit the reaction product to a treatment for eliminating hydrochloric acid or alcohol. If the second oxide is a halide, it will be possible to eliminate the reaction by-product mainly composed of hydrogen halide produced as a result of said contacting, by heating the by-product in atmospheric air at 200 to 1000° C., preferably 200 to 700° C.

Here, the heating subsequent to the contacting occurs at 25 to 800° C. This is because, if the heating occurs below 25° C., the reactivity of the halide or alkoxide will become so low that the coating layer will not be satisfactorily formed on the surface of the powder matrix, whereas, if the heating temperature exceeds 800° C., the hydroxyl groups on the surface of the powder matrix will so completely condense themselves that they can not react with the halide or alkoxide, and thus can not participate in the formation of the coating layer. Here, to eliminate the reaction by-product heating occurs in a range of 200 to 1000° C. This is because, if the heating temperature is below 200° C., the reaction by-product will not be sufficiently eliminated, whereas, if the heating temperature exceeds 1000° C., powder particles will aggregate. Because the present method can manufacture the oxide powder comparatively easily as seen from above, it will be possible to reduce the production cost of the oxide powder and to uniformly form the coating layer on the surface of the powder matrix. Said halide may include titanium tetrachloride, aluminum chloride, silicon tetrachloride, etc., while said alkoxide may include titanium tetraisopropoxide, silicon tetraethoxide, etc.

Figure 1:
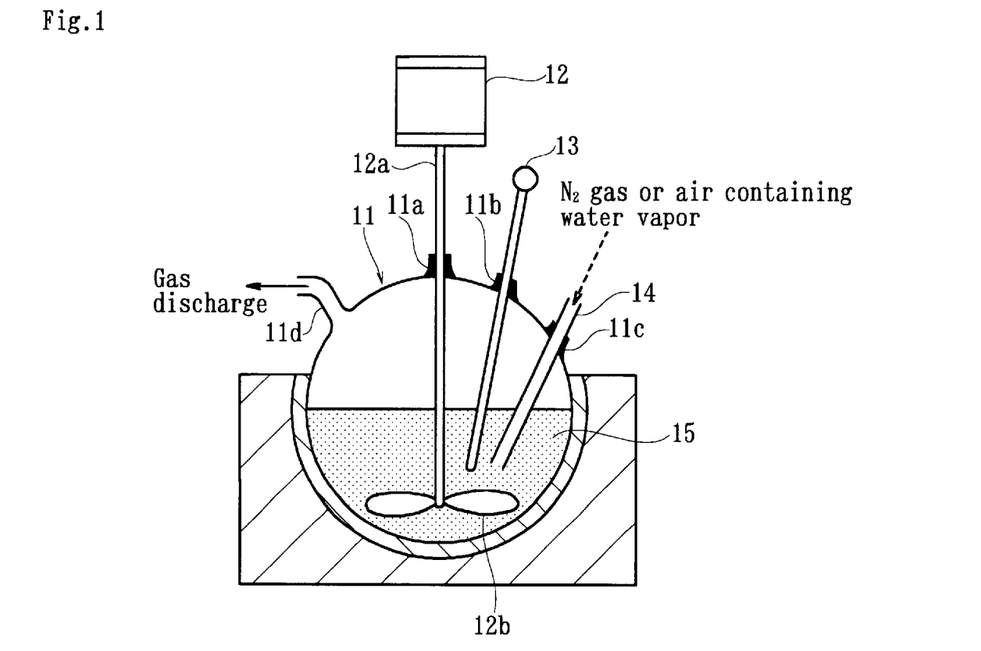
FIG. 1 is a schematic cross-section of a moisture controlling apparatus for illustrating how the apparatus adjusts the amount of water absorbed by the powder matrix of an oxide powder in an embodiment of this invention.

To adjust the absorbed water amount of the powder matrix to 0.1 to 50%, a reaction vessel is used. The reaction vessel may include, for example, a four-mouthed flask 11 to whose mouths are fixed first to fourth short sockets 11a to 11d as shown in FIG. 1. Into the first short socket 11a is inserted rotationally the stirring shaft 12a of a stirrer 12; into the second short socket 11b is inserted a thermometer 13; and into the third short socket 11c is inserted a gas guide tube 14. The stirring shaft 12a has stirring blades 12b at its lowest end. This four-mouthed flask is so configured as to be divided into the upper and lower halves, although the configuration is not illustrated here. After a powder matrix 15 is placed in this four-mouthed flask 11, the powder matrix 15 is stirred with the stirrer 12, and at the same time nitrogen gas ($N_2$ gas) containing water vapor, or atmospheric air containing water vapor is introduced through the gas guide tube 14. During this operation, the flowing amount of $N_2$ gas or atmospheric air is adjusted so that the temperature of the powder matrix may remain above its dew point, while the temperature indicated by the thermometer 13 being monitored. The fourth short socket or tube 11d serves as a vent through which $N_2$ gas or atmospheric air is discharged after the powder matrix has absorbed an adjusted amount of water. Further, the connector with which the fourth short socket 11d is fixed to the flask 11 includes a bag filter (not illustrated here) to prevent the exit of the powder matrix 15 together with $N_2$ gas. The reaction vessel may include a reaction vessel based on a fluidized bed, although it is not illustrated here. This reaction vessel receives a specified amount of powder matrix, and introduces nitrogen gas ($N_2$ gas) containing water vapor, or atmospheric air containing water vapor for a specified period of time, to thereby adjust the amount of water absorbed by the powder matrix. During operation, the reaction vessel is kept at a temperature over the dew point.

To coat the powder matrix whose absorbed water amount has been adjusted, with a coating layer, a fluidized bed reaction apparatus is used. Such a reaction apparatus may be configured, for example, like the one shown in FIG. 2: a cylindrical body 22 with both ends closed extends in a vertical direction; a material introducing tube 23 to introduce a powder matrix 15 into the cylindrical body 22 is connected at a middle point of the length of the cylindrical body 22 to its side wall; a baffle plate 24 to receive the powder matrix 15 is placed in the cylindrical body 22 close to its lowest end; and a gas guide tube 25 to introduce a carrier gas and an alkoxide into the cylindrical body 22 is connected to the cylindrical body 22 on its bottom wall 22a. The baffle plate is made of a porous or mesh-like material whose pore size is finer than the average size of the powder matrix 15. A lower outflow tube 26 is connected to the side wall of the cylindrical body 22 at a level slightly above the level of the baffle plate, while an upper outflow tube 27 is connected to the side wall of the cylindrical body 22 at a mid-point between the levels of the material introducing tube 23 and the lower outflow tube 26.

The lower outflow tube 26 is provided with a manually operable valve 28 to open/close the tube, while the upper outflow tube 27 is provided with a flow adjusting valve 29 to adjust the flow of oxide powder passing through the tube. The lower outflow tube 26 and the upper outflow tube 27 merge into a collective exit tube 30. The top-most portion of the cylindrical body 22 has a bag filter 31 to prevent the exit of powder matrix together with exhaust gas, and the uppermost wall 22b of the cylindrical body 22 has an exhaust pipe 32 for discharging exhaust gas connected. This reaction apparatus 21 allows the continuous manufacture of an oxide powder: a powder matrix 15 is continuously supplied through the material introducing tube 23 into the cylindrical body 22; a halide or an alkoxide and a carrier gas are introduced through the gas guide tube 25 into the cylindrical body 22; and the manually operable valve 28 is closed and the flow adjusting valve is set at a position to give a predetermined aperture. Alternatively, this reaction apparatus 21 allows the manufacture of an oxide powder on a batch basis: a specified amount of powder matrix 15 is supplied through the material introducing tube 23 into the cylindrical body 22; a halide or an alkoxide and a carrier gas are introduced through the gas guide tube 25 into the cylindrical body 22; and the manually operable valve 28 and the flow adjusting valve 29 are closed; and the manually operable valve 28 is opened after a specified time.

With the oxide powder thus manufactured, the powder matrix and its coating layer develop their respective physical and chemical activities satisfactorily. To put it specifically, if an oxide powder is used as an additive for a toner for electronic photography and the above coating layer includes titania, the coating layer provides the toner with fluidity and charge stability at the same time. If the coating layer includes alumina, the coating layer will improve the abrasive activity of the oxide powder, and provide the oxide powder with a heat insulating activity and anion absorbing activity. If the coating layer includes silica, the coating layer will provide the oxide powder with dispersion stability, and improve the fluidity of the oxide powder. If the coating layer includes cerium oxide, the coating layer will improve the abrasive activity of the oxide powder, and, if the oxide powder is added to silicone rubber to be kneaded, it will provide the silicone rubber with heat resistance. If the above coating layer includes iron oxide, the coating layer will provide the silicone rubber with heat resistance. If the above coating layer contains stannic oxide or antimony oxide, and the coating layer will provided the oxide powder with electro-conductivity. Moreover, if the powder matrix is titania, the coating layer will inhibit the photo-catalytic activity of the oxide powder.

Next, products incorporating the oxide powder will be described.

(a) Abrasives

If an oxide powder is used as an abrasive a silica powder is used as a first oxide of a powder matrix, and a second oxide of a coating layer includes a metal element (one or two or more elements selected from the group consisting of transition elements of the 3A, 4A, 5A, 6A, 7A, 8, 1B and 2B families, and typical elements of the 3B, 4B and 5B families in the periodic table). Particularly, the second oxide is preferably alumina, titania, zirconia or ceria. Moreover, this abrasive is preferably used to prepare a slurry for chemcal/mechanical abrasion.

(b) Ink-Receiving Layer Forming Materials

If an oxide powder is used as an ink-receiving layer forming material, a silica powder is used as a first oxide of a powder matrix, and a second oxide of a coating layer, includes a metal element (one or two or more elements selected from the group consisting of transition elements of the 3A, 4A, 5A, 6A, 7A, 8, 1B and 2B families, and typical elements of the 3B, 4B and 5B families in the periodic table). Particularly, the second oxide is preferably alumina, titania, zirconia or ceria. Moreover, this ink-receiving layer forming material is obtained by adding water or polyvinyl alcohol to the oxide powder. The ink-receiving layer forming material preferably contains the oxide powder at 5 to 30 wt %. If this ink-receiving layer forming material is applied to a sheet of paper or film, and dried, an ink-jet oriented print material will be obtained.

(c) Additives For Toner

An additive for toner is obtained by preparing an oxide powder by providing a coating layer of a second oxide being titania on the surface of a powder matrix of a first oxide being silica, and by reforming the surface of the oxide powder with a silane coupling agent or a silicone compound as represented in any one of formulas (1) to (3). This additive for toner may be added to toners for electronic photocopy machines or for laser printers.

(d) Ultraviolet Ray Absorbing Agents

A ultraviolet ray absorbing agent is obtained by preparing an oxide powder by providing a coating layer of a second oxide being any one of silica, alumina and iron oxide on the surface of a powder matrix of a first oxide being titania, and by reforming the surface of the powder particle with a silane coupling agent or a silicone compound as represented in any one of formulas (1) to (3). This ultraviolet ray absorbing agent may be added to cosmetics.

(e) Electro-Conductive Powders

An electro-conductive powder is obtained by preparing an oxide powder by providing a coating layer of a second oxide being titania or antimony-doped stannic oxide (ATO) on the surface of a powder matrix of a first oxide being silica. This electro-conductive powder is used to form an electro-conductive coat.

Next, the examples of this invention will be described in detail below together with comparative examples.

<EXAMPLE 1>

As shown in FIG. 1, the absorbed water amount of a powder matrix 15 was adjusted using a reaction vessel 11. To put it specifically, 100 g of a hydrophilic silica powder 15 (powder matrix) which has an average particle size of 0.012 $\mu$m and a surface hydroxyl group number of 3.7 $\mu$mol/m$^2$ was placed in a four-mouthed flask 11 (reaction vessel) having a volume of 5 liter; and the powder was stirred with a stirrer 12. The stirring occurred while the silica powder 15 was exposed to a jet of $N_2$ gas containing water vapor or of atmospheric air containing water vapor. During this operation, the inflow of nitrogen gas ($N_2$ gas) or air was adjusted so as to keep the temperature of the silica powder 15 above the dew point while a close look was directed to the indication of a thermometer 13. The absorbed water amount of the powder matrix 15 was obtained as follows: about 1 g of the silica powder whose absorbed water amount had been adjusted as above was sampled in a 1 g weighing bottle; it was heated at 105° C. for two hours to dryness for weighing; and the percent (%) of the weight loss before and after the drying was determined by calculation. The absorbed water amount of this particular example was 4.0%.

As shown in FIG. 2, sixty gram of the silica powder which had its water content adjusted as above was transferred through a material introducing tube 23 into a fluidized bed reaction apparatus 21 having a volume of 17 liter. The transferred silica powder rested on a baffle plate 24. At this state, the reaction apparatus 21 was heated to 60° C., and then 8.6 g of titanium tetrachloride was introduced together with $N_2$ gas through a gas guide tube 25 formed on the bottom wall 22a of the reaction apparatus 21 into the reaction apparatus 21. The $N_2$ gas serves as a carrier gas of titanium tetrachloride and as an agitator to keep the silica powder in a fluent state. When titanium tetrachloride conveyed by $N_2$ gas came into contact with the silica powder, a coating layer of titania was provided on the surface of the silica powder as a result of chemical reaction, and an oxide powder resulted. Then, the reaction apparatus 21 was maintained at 200° C. for 12 hours while allowing the passage of $N_2$ gas, to thereby eliminate hydrochloric acid, and then the manually operable valve 28 was opened so that the oxide powder could be collected through the lower outflow tube 26. The oxide powder thus produced was termed Example 1.

<EXAMPLE 2>

100 g of a hydrophilic silica powder (powder matrix) which has an average particle size of 0.012 $\mu$m and a surface hydroxyl group number of 3.7 $\mu$mol/m$^2$ was placed in a four-mouthed flask 11 (reaction vessel) having a volume of 5 liter; and the absorbed water amount of the silica powder was adjusted as in Example 1. The absorbed water amount of this particular example was 35.5%.

Sixty gram of the silica powder which had its water content adjusted as above was transferred into a fluidized bed reaction apparatus having a volume of 17 liter. Then, while the silica powder being kept in a fluent state in the presence of $N_2$ gas, 25.0 g of titanium tetrachloride was introduced together with $N_2$ gas from the bottom wall of the reaction apparatus, to thereby allow titanium tetrachloride to come into contact with the silica powder so that a coating layer of titania could be provided on the surface of the silica powder. Then, the reaction apparatus was maintained at 200° C. for 12 hours while still allowing the passage of $N_2$ gas, to thereby eliminate hydrochloric acid. The oxide powder thus produced was termed Example 2.

<EXAMPLE 3>

100 g of a hydrophilic silica powder (powder matrix) which has an average particle size of 0.012 $\mu$m and a surface hydroxyl group number of 3.7 $\mu$mol/m$^2$ was placed in a four-mouthed flask (reaction vessel) having a volume of 5 liter, and stirred in the atmosphere; and the absorbed water amount of the silica powder was adjusted as in Example 1. The absorbed water amount of this particular example was 9.0%.

Sixty gram of the silica powder which had its water content adjusted as above was transferred into a fluidized bed reaction apparatus having a volume of 17 liter. Then, while the silica powder being kept in a fluent state in the presence of $N_2$ gas, 6.2 g of titanium tetraisopropoxide was introduced together with $N_2$ gas from the bottom wall of the reaction apparatus, to thereby allow titanium tetraisopropoxide to come into contact with the silica powder so that a coating layer of titania could be provided on the surface of the silica powder. Then, the reaction apparatus was maintained at 150° C. for 2 hours while still allowing the passage of $N_2$ gas, to thereby eliminate alcohol. The oxide powder thus produced was termed Example 3.

<EXAMPLE 4>

100 g of a hydrophilic silica powder (powder matrix) which has an average particle size of 0.007 $\mu$m and a surface hydroxyl group number of 3.7 $\mu$mol/m$^2$ was placed in a four-mouthed flask (reaction vessel) having a volume of 5 liter, and stirred in the atmosphere; and the absorbed water amount of the silica powder was adjusted as in Example 1. The absorbed water amount of this particular example was 9.0%.

Sixty gram of the silica powder which had its water content adjusted as above was transferred into a fluidized bed reaction apparatus having a volume of 17 liter. Then, while the silica powder being kept in a fluent state in the presence of $N_2$ gas, 6.5 g of titanium tetrachloride was introduced together with $N_2$ gas from the bottom wall of the reaction apparatus, to thereby allow titanium tetrachloride to come into contact with the silica powder so that a coating layer of titania could be provided on the surface of the silica powder. Then, the reaction apparatus was maintained at 500° C. for 6 hours while still allowing the passage of $N_2$ gas, to thereby eliminate hydrochloric acid. The oxide powder thus produced was termed Example 4.

<EXAMPLE 5>

100 g of a hydrophilic silica powder (powder matrix) which has an average particle size of 0.04 $\mu$m and a surface hydroxyl group number of 3.7 $\mu$mol/m$^2$ was placed in a four-mouthed flask (reaction vessel) having a volume of 5 liter, and stirred in the atmosphere; and the absorbed water amount of the silica powder was adjusted as in Example 1. The absorbed water amount of this particular example was 1.0%.

Sixty gram of the silica powder which had its water content adjusted as above was transferred into a fluidized bed reaction apparatus having a volume of 17 liter. Then, while the silica powder being kept in a fluent state in the presence of $N_2$ gas, 0.3 g of titanium tetrachloride was introduced together with $N_2$ gas from the bottom wall of the reaction apparatus, to thereby allow titanium tetrachloride to come into contact with the silica powder so that a coating layer of titania could be provided on the surface of the silica powder. Then, the reaction apparatus was maintained at 500° C. for 6 hours while still allowing the passage of $N_2$ gas, to thereby eliminate hydrochloric acid. The oxide powder thus produced was termed Example 5.

<EXAMPLE 6>

100 g of a hydrophilic silica powder (powder matrix) which has an average particle size of 0.006 $\mu$m and a surface hydroxyl group number of 3.7 $\mu$mol/m$^2$ was placed in a four-mouthed flask (reaction vessel) having a volume of 5 liter, and stirred in the atmosphere; and the absorbed water amount of the silica powder was adjusted as in Example 1. The absorbed water amount of this particular example was 7.0%.

Sixty gram of the silica powder which had its water content adjusted as above was transferred into a fluidized bed reaction apparatus having a volume of 17 l. Then, while the silica powder being kept in a fluent state in the presence of $N_2$ gas, 46 g of aluminum chloride was introduced together with $N_2$ gas from the bottom wall of the reaction apparatus, to thereby allow aluminum chloride to come into contact with the silica powder so that a coating layer of alumina could be provided on the surface of the silica powder. Then, the reaction apparatus was maintained at 500° C. for 6 hours while still allowing the passage of $N_2$ gas, to thereby eliminate hydrochloric acid. The oxide powder thus produced was termed Example 6.

<EXAMPLE 7>

100 g of a hydrophilic silica powder (powder matrix) which has an average particle size of 0.012 $\mu$m and a surface hydroxyl group number of 3.7 $\mu$mol/m$^2$ was placed in a four-mouthed flask (reaction vessel) having a volume of 5 liter, and stirred in the atmosphere; and the absorbed water amount of the silica powder was adjusted as in Example 1. The absorbed water amount of this particular example was 1.0%.

Sixty gram of the silica powder which had its water content adjusted as above was transferred into a fluidized bed reaction apparatus having a volume of 17 liter. Then, while the silica powder being kept in a fluent state in the presence of $N_2$ gas, 28 g of aluminum isopropoxide was introduced together with $N_2$ gas from the bottom wall of the reaction apparatus, to thereby allow aluminum isopropoxide to come into contact with the silica powder so that a coating layer of alumina could be provided on the surface of the silica powder. Then, the reaction apparatus was maintained at 200° C. for 6 hours while still allowing the passage of $N_2$ gas, to thereby eliminate alcohol. The oxide powder thus produced was termed Example 7.

<EXAMPLE 8>

100 g of a hydrophilic silica powder (powder matrix) which has an average particle size of 0.012 μm and a surface hydroxyl group number of 3.7 μmol/m$^2$ was placed in a four-mouthed flask (reaction vessel) having a volume of 5 liter, and stirred in the atmosphere; and the absorbed water amount of the silica powder was adjusted as in Example 1. The absorbed water amount of this particular example was 1.0%.

Sixty gram of the silica powder which had its water content adjusted as above was transferred into a fluidized bed reaction apparatus having a volume of 17 liter. Then, while the silica powder being kept in a fluent state in the presence of $N_2$ gas, 10.8 g of cerium chloride was introduced together with $N_2$ gas from the bottom wall of the reaction apparatus, to thereby allow cerium chloride to come into contact with the silica powder so that a coating layer of ceria could be provided on the surface of the silica powder. Then, the reaction apparatus was maintained at 500° C. for 6 hours while still allowing the passage of $N_2$ gas, to thereby eliminate hydrochloric acid. The oxide powder thus produced was termed Example 8.

<EXAMPLE 9>

100 g of a hydrophilic silica powder (powder matrix) which has an average particle size of 0.012 μm and a surface hydroxyl group number of 3.7 μmol/m$^2$ was placed in a four-mouthed flask (reaction vessel) having a volume of 5 liter, and stirred in the atmosphere; and the absorbed water amount of the silica powder was adjusted as in Example 1. The absorbed water amount of this particular example was 9.0%.

Sixty gram of the silica powder which had its water content adjusted as above was transferred into a fluidized bed reaction apparatus having a volume of 17 liter. Then, while the silica powder being kept in a fluent state in the presence of $N_2$ gas, 6.0 g of iron chloride was introduced together with $N_2$ gas from the bottom wall of the reaction apparatus, to thereby allow iron chloride to come into contact with the silica powder so that a coating layer of iron oxide could be provided on the surface of the silica powder. Then, the reaction apparatus was maintained at 500° C. for 6 hours while still allowing the passage of $N_2$ gas, to thereby eliminate hydrochloric acid. The oxide powder thus produced was termed Example 9.

<EXAMPLE 10>

100 g of a hydrophilic titania powder (powder matrix) which has an average particle size of 0.015 μm and a surface hydroxyl group number of 7.4 μmol/m$^2$ was placed in a four-mouthed flask (reaction vessel) having a volume of 5 liter, and stirred in the atmosphere; and the absorbed water amount of the titania powder was adjusted as in Example 1. The absorbed water amount of this particular example was 9.0%.

Sixty gram of the titania powder which had its water content adjusted as above was transferred into a fluidized bed reaction apparatus having a volume of 17 liter. Then, while the titania powder being kept in a fluent state in the presence of $N_2$ gas, 4.5 g of silicon tetrachloride was introduced together with $N_2$ gas from the bottom wall of the reaction apparatus, to thereby allow silicon tetrachloride to come into contact with the titania powder so that a coating layer of silica could be provided on the surface of the titania powder. Then, the reaction apparatus was maintained at 500° C. for 6 hours while still allowing the passage of N2 gas, to thereby eliminate hydrochloric acid. The oxide powder thus produced was termed Example 10.

<EXAMPLE 11>

100 g of a hydrophilic titania powder (powder matrix) which has an average particle size of 0.015 μm and a surface hydroxyl group number of 7.4 μmol/m$^2$ was placed in a four-mouthed flask (reaction vessel) having a volume of 5 liter, and stirred in the atmosphere; and the absorbed water amount of the titania powder was adjusted as in Example 1. The absorbed water amount of this particular example was 9.0%.

Sixty gram of the titania powder which had its water content adjusted as above was transferred into a fluidized bed reaction apparatus having a volume of 17 liter. Then, while the titania powder being kept in a fluent state in the presence of $N_2$ gas, 2.6 g of aluminum chloride was introduced together with $N_2$ gas from the bottom wall of the reaction apparatus, to thereby allow aluminum chloride to come into contact with the titania powder so that a coating layer of alumina could be provided on the surface of the titania powder. Then, the reaction apparatus was maintained at 500° C. for 6 hours while still allowing the passage of $N_2$ gas, to thereby eliminate hydrochloric acid. The oxide powder thus produced was termed Example 11.

<EXAMPLE 12>

100 g of a hydrophilic titania powder (powder matrix) which has an average particle size of 0.015 μm and a surface hydroxyl group number of 7.4 μmol/m$^2$ was placed in a four-mouthed flask (reaction vessel) having a volume of 5 liter, and stirred in the atmosphere; and the absorbed water amount of the titania powder was adjusted as in Example 1. The absorbed water amount of this particular example was 5.0%.

Sixty gram of the titania powder which had its water content adjusted as above was transferred into a fluidized bed reaction apparatus having a volume of 17 liter. Then, while the titania powder being kept in a fluent state in the presence of $N_2$ gas, 7.2 g of iron chloride was introduced together with $N_2$ gas from the bottom wall of the reaction apparatus, to thereby allow iron chloride to come into contact with the titania powder so that a coating layer of iron chloride could be provided on the surface of the titania powder. Then, the reaction apparatus was maintained at 500° C. for 6 hours while still allowing the passage of $N_2$ gas, to thereby eliminate hydrochloric acid. The oxide powder thus produced was termed Example 12.

<EXAMPLE 13>

100 g of a hydrophilic silica powder (powder matrix) which has an average particle size of 0.012 μm and a surface hydroxyl group number of 3.7 $\mu mol/m^2$ was placed in a four-mouthed flask (reaction vessel) having a volume of 5 liter, and stirred in the atmosphere; and the absorbed water amount of the silica powder was adjusted as in Example 1. The absorbed water amount of this particular example was 1.5%.

Sixty gram of the silica powder which had its water content adjusted as above was transferred into a fluidized bed reaction apparatus having a volume of 17 liter. Then, while the silica powder being kept in a fluent state in the presence of $N_2$ gas, 7.5 g of tin chloride and 0.25 g of antimony chloride were introduced together with $N_2$ gas from the bottom wall of the reaction apparatus, to thereby allow tin chloride and antimony chloride to come into contact with the silica powder so that a coating layer of a composite compound of tin chloride and antimony chloride (antimony-doped stannic oxide, ATO) could be provided on the surface of the silica powder. Then, the reaction apparatus was maintained at 500° C. for 6 hours while still allowing the passage of $N_2$ gas, to thereby eliminate hydrochloric acid. The oxide powder thus produced was termed Example 13.

<EXAMPLE 14>

100 g of a hydrophilic silica powder (powder matrix) which has an average particle size of 0.012 $\mu$m and a surface hydroxyl group number of 3.7 $\mu mol/m^2$ was placed in a four-mouthed flask (reaction vessel) having a volume of 5 liter, and stirred in the atmosphere; and the absorbed water amount of the silica powder was adjusted as in Example 1. The absorbed water amount of this particular example was 1.0%.

Sixty gram of the silica powder which had its water content adjusted as above was transferred into a fluidized bed reaction apparatus having a volume of 17 liter. Then, while the silica powder being kept in a fluent state in the presence of $N_2$ gas, 4.3 g of vanadium tetrachloride was introduced together with $N_2$ gas from the bottom wall of the reaction apparatus, to thereby allow vanadium tetrachloride to come into contact with the silica powder so that a coating layer of vanadium oxide could be provided on the surface of the silica powder. Then, the reaction apparatus was maintained at 500° C. for 6 hours while still allowing the passage of $N_2$ gas, to thereby eliminate hydrochloric acid. The oxide powder thus produced was termed Example 14.

<EXAMPLE 15>

100 g of a hydrophilic silica powder (powder matrix) which has an average particle size of 0.012 $\mu$m and a surface hydroxyl group number of 3.7 $\mu mol/m^2$ was placed in a four-mouthed flask (reaction vessel) having a volume of 5 liter, and stirred in the atmosphere; and the absorbed water amount of the silica powder was adjusted as in Example 1. The absorbed water amount of this particular example was 0.5%.

Sixty gram of the silica powder which had its water content adjusted as above was transferred into a fluidized bed reaction apparatus having a volume of 17 liter. Then, while the silica powder being kept in a fluent state in the presence of $N_2$ gas, 4.5 g of molybdenum trichloride was introduced together with $N_2$ gas from the bottom wall of the reaction apparatus, to thereby allow molybdenum trichloride to come into contact with the silica powder so that a coating layer of molybdenum oxide could be provided on the surface of the silica powder. Then, the reaction apparatus was maintained at 500° C. for 6 hours while still allowing the passage of $N_2$ gas, to thereby eliminate hydrochloric acid. The oxide powder thus produced was termed Example 15.

<EXAMPLE 16>

100 g of a hydrophilic silica powder (powder matrix) which has an average particle size of 0.012 $\mu$m and a surface hydroxyl group number of 3.7 $\mu mol/m^2$ was placed in a four-mouthed flask (reaction vessel) having a volume of 5 liter, and stirred in the atmosphere; and the absorbed water amount of the silica powder was adjusted as in Example 1. The absorbed water amount of this particular example was 1.0%.

Sixty gram of the silica powder which had its water content adjusted as above was transferred into a fluidized bed reaction apparatus having a volume of 17 liter. Then, while the silica powder being kept in a fluent state in the presence of $N_2$ gas, 3.0 g of zinc chloride was introduced together with $N_2$ gas from the bottom wall of the reaction apparatus, to thereby allow zinc chloride to come into contact with the silica powder so that a coating layer of zinc chloride could be provided on the surface of the silica powder. Then, the reaction apparatus was maintained at 500° C. for 6 hours while still allowing the passage of $N_2$ gas, to thereby eliminate hydrochloric acid. The oxide powder thus produced was termed Example 16.

<EXAMPLE 17>

100 g of a hydrophilic silica powder (powder matrix) which has an average particle size of 0.012 $\mu$m and a surface hydroxyl group number of 3.7 $\mu mol/m^2$ was placed in a four-mouthed flask (reaction vessel) having a volume of 5 liter, and stirred in the atmosphere; and the absorbed water amount of the silica powder was adjusted as in Example 1. The absorbed water amount of this particular example was 2.0%.

Sixty gram of the silica powder which had its water content adjusted as above was transferred into a fluidized bed reaction apparatus having a volume of 17 liter. Then, while the silica powder being kept in a fluent state in the presence of $N_2$ gas, 5.1 g of zirconium chloride was introduced together with $N_2$ gas from the bottom wall of the reaction apparatus, to thereby allow zirconium chloride to come into contact with the silica powder so that a coating layer of zirconia could be provided on the surface of the silica powder. Then, the reaction apparatus was maintained at 500° C. for 6 hours while still allowing the passage of $N_2$ gas, to thereby eliminate hydrochloric acid. The oxide powder thus produced was termed Example 17.

<EXAMPLE 18>

100 g of a hydrophilic silica powder (powder matrix) which has an average particle size of 0.030 $\mu$m and a surface hydroxyl group number of 3.7 $\mu mol/m^2$ was placed in a four-mouthed flask (reaction vessel) having a volume of 5 liter, and stirred in the atmosphere; and the absorbed water amount of the silica powder was adjusted as in Example 1. The absorbed water amount of this particular example was 0.8%.

Sixty gram of the silica powder which had its water content adjusted as above was transferred into a fluidized bed reaction apparatus having a volume of 17 liter. Then, while the silica powder being kept in a fluent state in the presence of $N_2$ gas, 2 g of aluminum chloride was introduced together with $N_2$ gas from the bottom wall of the reaction apparatus, to thereby allow aluminum chloride to come into contact with the silica powder so that a coating layer of alumina could be provided on the surface of the silica powder. Then, the reaction apparatus was maintained at 500° C. for 6 hours while still allowing the passage of $N_2$ gas, to thereby eliminate hydrochloric acid. The oxide powder thus produced was termed Example 18.

<EXAMPLE 19>

100 g of a hydrophilic silica powder (powder matrix) which has an average particle size of 0.020 μm and a surface hydroxyl group number of 3.7 μmol/m² was placed in a four-mouthed flask (reaction vessel) having a volume of 5 liter, and stirred in the atmosphere; and the absorbed water amount of the silica powder was adjusted as in Example 1. The absorbed water amount of this particular example was 1.0%.

Sixty gram of the silica powder which had its water content adjusted as above was transferred into a fluidized bed reaction apparatus having a volume of 17 liter. Then, while the silica powder being kept in a fluent state in the presence of $N_2$ gas, 5.0 g of cerium chloride was introduced together with $N_2$ gas from the bottom wall of the reaction apparatus, to thereby allow cerium chloride to come into contact with the silica powder so that a coating layer of ceria could be provided on the surface of the silica powder. Then, the reaction apparatus was maintained at 500° C. for 6 hours while still allowing the passage of $N_2$ gas, to thereby eliminate hydrochloric acid. The oxide powder thus produced was termed Example 19.

<EXAMPLE 20>

120 g of an oxide powder prepared as in Example 6, 12 g of dispersant (AM-2150, Japan Surfactant Industrial Co.), 35 ml ethanol, 10 ml n-propanol, 5 ml ethyl acetate, and 12 g of polyvinyl alcohol (PVA235, KURARE) were dispersed using a homogenizer to produce an ink-receiving layer forming material. This ink-receiving layer forming material was applied by a barcoder method on a sheet of non-coat paper for ink-jet printing (IJ-L, Mitsubishi Paper Manufacturing Co.). After application, the coat was dried being exposed to a jet of warm air of 50° C. for three minutes, to produce a sheet of print material for ink-jet printing. The coat layer after drying was 30 μm in thickness. This ink-jet oriented print material was termed Example 20.

<Comparative Example 1>

100 g of a hydrophilic silica powder (powder matrix) which has an average particle size of 0.012 μm and a surface hydroxyl group number of 3.7 μmol/m² was kept in the atmosphere of 120° C. for one hour for drying. The absorbed water amount of this silica powder was made below 0.01%.

Sixty gram of the silica powder which had its water content adjusted as above was transferred into a fluidized bed reaction apparatus having a volume of 17 liter. Then, while the silica powder being kept in a fluent state in the presence of N2 gas, 4.3 g of titanium tetrachloride was introduced together with $N_2$ gas from the bottom wall of the reaction apparatus, to thereby allow titanium tetrachloride to come into contact with the silica powder so that a coating layer of titania could be provided on the surface of the silica powder. Then, the reaction apparatus was maintained at 500° C. for 6 hours while still allowing the passage of $N_2$ gas, to thereby eliminate hydrochloric acid. The oxide powder thus produced was termed Comparative example 1.

<Comparative Example 2>

100 g of a hydrophilic silica powder (powder matrix) which has an average particle size of 0.012 μm and a surface hydroxyl group number of 3.7 μmol/m² was placed in a four-mouthed flask (reaction vessel) having a volume of 5 liter, and stirred in the atmosphere; and the absorbed water amount of the silica powder was adjusted. The absorbed water amount of this particular example was 60.0%.

Sixty gram of the silica powder which had its water content adjusted as above was transferred into a fluidized bed reaction apparatus having a volume of 17 liter. Then, while the silica powder being kept in a fluent state in the presence of $N_2$ gas, 25.0 g of titanium tetrachloride was introduced together with $N_2$ gas from the bottom wall of the reaction apparatus, to thereby allow titanium tetrachloride to come into contact with the silica powder so that a coating layer of titania could be provided on the surface of the silica powder. Then, the reaction apparatus was maintained at 500° C. for 6 hours while still allowing the passage of $N_2$ gas, to thereby eliminate hydrochloric acid. The oxide powder thus produced was termed Comparative example 2.

<Comparative Example 3>

30 g of a hydrophilic silica powder having an average particle size of 0.012 μm, and 7.5 g of hydrophilic titania powder having an average particle size of 0.017 μm were stirred with a mixer for mixture. The resulting oxide powder was termed Comparative example 3.

<Comparative Example 4>

30 g of a hydrophilic silica powder (powder matrix) which has an average particle size of 28 μm and a surface hydroxyl group number of 3.7 μmol/m² was placed in a four-mouthed flask (reaction vessel) having a volume of 2 liter, and stirred in the atmosphere, to thereby adjust the water content of the silica powder. The absorbed water amount of this silica powder was 0.3%.

While the silica powder which had its water content adjusted as above was being stirred, 1.0 g of titanium tetrachloride was introduced into the flask together with $N_2$ gas, to thereby allow titanium tetrachloride to come into contact with the silica powder so that a coating layer of titania could be provided on the surface of the silica powder. Then, the reaction apparatus was maintained at 500° C. for 6 hours while still allowing the passage of $N_2$ gas, to thereby eliminate hydrochloric acid. The oxide powder thus produced was termed Comparative example 4.

<Comparative Example 5>

100 g of a hydrophobic silica powder (powder matrix) which has an average particle size of 0.022 μm and a surface hydroxyl group number of 0.08 μmol/m², and had the surface of the silica powder treated with a silicone oil was placed in a four-mouthed flask (reaction vessel) having a volume of 5 liter, and stirred in the atmosphere, to thereby adjust the water content of the silica powder. The absorbed water amount of this silica powder was 0.1%.

Sixty gram of the silica powder which had its water content adjusted as above was transferred into a fluidized bed reaction apparatus having a volume of 17 liter. Then, while the silica powder being kept in a fluent state in the presence of $N_2$ gas, 4.3 g of titanium tetrachloride was introduced together with $N_2$ gas from the bottom wall of the reaction apparatus, to thereby allow titanium tetrachloride to come into contact with the silica powder so that a coating layer of titania could be provided on the surface of the silica powder. Then, the reaction apparatus was maintained at 180° C. for 12 hours while still allowing the passage of $N_2$ gas, to thereby eliminate hydrochloric acid. The oxide powder thus produced was termed Comparative example 5.

<Comparative Example 6>

30 g of a hydrophilic silica powder (powder matrix) which has an average particle size of 0.012 μm and a surface hydroxyl group number of 3.7 μmol/m² was placed in a four-mouthed flask (reaction vessel) having a volume of 2 liter, and stirred in the atmosphere; and the absorbed water amount of the silica powder was adjusted. The absorbed water amount of this particular example was 4.0%.

While the silica powder which had its water content adjusted as above was being stirred, 4.3 g of titanium tetrachloride was introduced into the flask together with $N_2$ gas, to thereby allow titanium tetrachloride to come into contact with the silica powder so that a coating layer of titania could be provided on the surface of the silica powder. Then, the reaction apparatus was maintained at 200° C. for 12 hours while still allowing the passage of $N_2$ gas, to thereby eliminate hydrochloric acid. The oxide powder thus produced was termed Comparative example 6.

<Comparative Example 7>

An oxide powder comprising composite particles which have an average particle size of 0.023 μm and are obtained from titania and iron oxide by a dry method was termed Comparative example 7

<Comparative Example 8>

A hydrophilic silica powder having an average particle size of 0.012 μm was termed Comparative example 8.

<Comparative Example 9>

A hydrophilic titania powder having an average particle size of 0.017 μm was termed Comparative example 9.

<Comparative Example 10>

30 g of a hydrophilic titania powder having an average particle size of 0.017 μm, and 7.5 g of a hydrophilic silica powder having an average particle size of 0.012 μm were stirred with a mixer for mixture. The resulting mixed powder was termed Comparative example 10.

<Comparative Example 11>

An ATO powder having an average particle size of 0.010 μm was termed Comparative example 11.

<Comparative Example 12>

100 g of a hydrophilic silica powder (powder matrix) which has an average particle size of 0.012 μm and a surface hydroxyl group number of 3.7 μmol/m² was kept in the atmosphere of 120° C. for one hour for drying. The absorbed water amount of this silica powder was made below 0.01%.

Sixty gram of the silica powder thus dried was transferred into a fluidized bed reaction apparatus having a volume of 17 liter. Then, while the silica powder being kept in a fluent state in the presence of $N_2$ gas, 28.0 g of aluminum chloride was introduced together with $N_2$ gas from the bottom wall of the reaction apparatus, to thereby allow aluminum chloride to come into contact with the silica powder so that a coating layer of alumina could be provoded on the surface of the silica powder. Then, the reaction apparatus was maintained at 500° C. for 6 hours while still allowing the passage of $N_2$ gas, to thereby eliminate hydrochloric acid. The oxide powder thus produced was termed Comparative example 12.

<Comparative Example 13>

A hydrophilic silica powder having an average particle size of 0.030 μm was termed Comparative example 13.

<Comparative Example 14>

A hydrophilic alumina powder having an average particle size of 0.019 μm was termed Comparative example 14.

<Comparative Example 15>

30 g of a hydrophilic silica powder having an average particle size of 0.020 μm, and 3.4 g of a hydrophilic alumina powder having an average particle size of 0.019 μm were stirred with a mixer for mixture. The resulting mixed powder was termed Comparative example 15.

<Comparative Example 16>

120 g of an oxide powder prepared as in Comparative example 7, 12 g of dispersant (AM-2150, Japan Surfactant Industrial Co.), 35 ml ethanol, 10 ml n-propanol, 5 ml ethyl acetate, and 12 g of polyvinyl alcohol (PVA235, KURARE) were dispersed using a homogenizer to produce an ink-receiving layer forming material. This ink-receiving layer forming material was applied by a barcoder method on a sheet of non-coat paper for ink-jet printing (IJ-T, Mitsubishi Paper Manufacturing Co.). After application, the coat was dried being exposed to a jet of warm air of 50° C. for three minutes, to produce a sheet of print material for ink-jet printing. The coat layer after drying was 30 μm in thickness. This ink-jet oriented print material was termed Comparative example 16.

<Comparative Test 1 and Its Evaluation>

The oxide powders of Examples 1 to 19, Comparative examples 1 to 7, and Comparative example 12 were tested, for the content of the coating layer, the specific surface area, and the uniformity of coating layer in the oxide powder. The results are shown in Tables 1 and 2.

The content of the coating layer was derived from the weight of metal elements contained in the oxide powder which was measured with an SEM-EDX (SEM—Scanning Electron Microscope, JSM-5300LV; EDX—energy-Dispersion type fluorescence X-ray analyzer, JED-2001, Japan Electron Datum). In deriving the content of coating layer, it was assumed that all the metal elements exist as oxides.

The specific surface area was derived by vapor-phase adsorption: a certain gas molecule (nitrogen) which adheres to the surface of an oxide powder with a known adherence area is allowed to be adsorbed to the surface of a test oxide powder; and the surface area of the test oxide powder was determined by the adsorbed amount of the gas molecule.

The uniformity of the coating layer was evaluated on the basis of the presence of agglomerates, the variation in the contents of the coating layer, and the ratio of the coating layer to the powder matrix. A criterion by which to judge whether a given oxide powder has agglomerates or not is set at 1/1000: when no more than one agglomerate of powder particles exists in 1000 powder particles of the population, that oxide powder was judged to be free from agglomerates, whereas when one or more agglomerate of powder particles exist in 1000 powder particles of the population, that oxide powder was judged to have agglomerates.

The variation in the contents of the coating layer was evaluated with a TEM-EDX (TEM, JEM-2010F, Nippon Electronics, and EDX, VOYAGER3, Norlan). To put it specifically, the elementary analysis of a test oxide powder was carried out at 10 spots with one spot having an area of 10 nm×10 nm under an electron bombardment accelerated in a field of 200 kV; and the measured contents of test element were processed to give an average; and a variation was derived from the average. The variation in the contents of coating layer can be obtained by the following formulas (4) and (5):

$$(B-A)/A \times 100\ (\%) \ldots \quad (4)$$

$$(A-C)/A \times 100\ (\%) \ldots \quad (5)$$

where A represents the average (%) obtained from the elementary analysis (10 points), B represents the maximum (%) obtained in the elementary analysis (10 points), and C represents the minimum (%) obtained in the elementary analysis (10 points). Out of the values obtained from the formulas (4) and (5), the larger one was adopted as the variation.

The ratio of the coating layer to the powder matrix was evaluated using a TEM-EELS (TEM, JEM-2010F, Nippon Electronics, and EELS, GIF200, GATAN). Specifically, the surface analysis was carried out on the surface of a test oxide powder under an electron bombardment in the field of 200 kV, and the fraction of uniformly distributed test element was taken as representative of uniformity.

TABLE 1

|  | Powder matrix/ coating layer | Absorbed Water amount of powder Matrix (%) | Oxide powder Content of Coating Layer (%) | Specific surface Area ($m^2/g$) | Uniformity of coat Presence of agglomerates | Variation of contents (%) | Ratio of coat (%) |
|---|---|---|---|---|---|---|---|
| Example 1 | Silica/titania | 4.0 | 4.0 | 181 | None | ±16 | 95 |
| Example 2 | Silica/titania | 35.5 | 18.2 | 156 | None | ±55 | 70 |
| Example 3 | Silica/titania | 9.0 | 3.2 | 183 | None | ±23 | 90 |
| Example 4 | Silica/titania | 9.0 | 6.3 | 272 | None | ±34 | 85 |
| Example 5 | Silica/titania | 1.0 | 0.3 | 12 | None | ±15 | 90 |
| Example 6 | Silica/alumina | 7.0 | 28.0 | 348 | None | ±47 | — |
| Example 7 | Silica/alumina | 1.0 | 9.1 | 177 | None | ±30 | — |
| Example 8 | Silica/ceria | 1.0 | 9.2 | 175 | None | ±28 | 85 |
| Example 9 | Silica/iron oxide | 9.0 | 6.9 | 172 | None | ±18 | 90 |
| Example 10 | Titania/silica | 9.0 | 4.0 | 80 | None | ±20 | 95 |
| Example 11 | Titania/alumina | 9.0 | 3.1 | 78 | None | ±32 | — |
| Example 12 | Titania/iron oxide | 5.0 | 6.8 | 75 | None | ±37 | 85 |
| Example 13 | Silica/ATO | 1.5 | 7.2 | 165 | None | ±41 | — |
| Example 14 | Silica/vanadium oxide | 1.0 | 4.2 | 184 | None | ±25 | 90 |
| Example 15 | Silica/molybdenum oxide | 0.5 | 7.1 | 176 | None | ±37 | 75 |
| Example 16 | Silica/zinc oxide | 1.0 | 4.2 | 174 | None | ±27 | 80 |
| Example 17 | Silica/Zirconia | 2.0 | 7.3 | 171 | None | ±25 | 85 |
| Example 18 | Silica/alumina | 0.8 | 1.1 | 48 | None | ±24 | — |
| Example 19 | Silica/ceria | 1.0 | 4.0 | 83 | None | ±27 | 83 |

TABLE 2

|  | Powder matrix/ coating layer | Absorbed Water amount of powder matrix (%) | Uniformity of coat Content of coating layer (%) | Specific surface area ($m^2/g$) | Uniformity of coat Presence of agglomerates | Variation of contents (%) | Ratio of coat (%) |
|---|---|---|---|---|---|---|---|
| Comparative example 1 | Silica/titania | <0.01 | 1.0 | 174 | None | ±22 | 40 |
| Comparative example 2 | Silica/titania | 60.0 | 19.0 | 65 | Present | ±240 | 10 |
| Comparative example 3 | Silica/titania (mixture), | 0.3 | 20.0 | 180 | Present | ±380 | 0 |
| Comparative example 4 | Silica/titania | 0.3 | 0.2 | 0.1 | None | ±80 | 60 |
| Comparative example 5 | Silica/titania | 0.1 | 0 | 110 | None | — | 0 |
| Comparative example 6 | Silica/titania | 4.0 | 4.0 | 170 | Present | ±90 | 20 |
| Comparative example 7 | Composite particles of titania and iron oxide | 2.0 | 2.0 | 50 | None | ±90 | — |
| Comparative example 12 | Silica/alumina | <0.01 | 0.9 | 177 | None | ±31 | — |

As is obvious from Tables 1 and 2, agglomerates developed in Comparative examples 2, 3 and 6 while they were not present in Examples 1 to 17. The variation in the contents of the coating layer was as large as ±80 to ±380% in Comparative examples 2 to 4 and 6 and 7, while the same was ±15 to ±55% in Examples 1 to 17. The fraction of the coating layer was 0 to 60% in Comparative examples 1 to 6, while it was 70 to 95% in Examples 1 to 5, 8 to 10, and 12 and 14 to 17. In Example 2, the variation in the contents of the coating layer was ±55%, which is comparatively large. This is because the powder matrix had a large absorbed water amount of 35.5%.

<Comparative Test 2 and Its Evaluation>

The oxide powders of Examples 1 to 3, Comparative examples 1 to 4, and Comparative examples 8 and 9 were tested, for the content of the coating layer, the specific surface area, the quantity of charged electricity, and the fluency in the oxide powder. The results are shown in Table 3.

The content of the coating layer and the specific surface area were determined as in Comparative test 1.

The charge quantity of a test oxide powder was obtained by placing 50 g of iron powder carrier and 0.1 g of hydrophobic oxide powder in a glass vessel having a volume of 75 ml, closing the vessel with a cap, agitating the vessel with a turbulent mixer for five minutes, sampling 0.1 g of the iron powder carrier mixed with the oxide powder, and exposing the sample to a blow of nitrogen in a blow-off charged electricity meter (TB-200, Toshiba Chemical) for one minute, to give a charge electricity measurement.

The fluency of a test oxide powder was evaluated based on the passage through screens. Specifically, 0.4 g of a hydrophobic oxide powder and 40 g of a negatively charged toner 8 $\mu$m in size was mixed with a mixer, to produce a toner composition for electronic photography. The toner composition was applied in order to a 150 $\mu$m screen, 75 $\mu$m screen, and 45 $\mu$m screen each of which was agitated by a powder tester (PT-N type, Hosokawa Micron), and the fraction (%) of the powder which passed all the filters was taken as representative of the fluency of the oxide powder.

TABLE 3

| | | Oxide powder | | | |
|---|---|---|---|---|---|
| | | | Specific | Test item | |
| | Powder matrix/ coating layer | Content of coating layer (%) | surface area (m²/g) | Charge electricity ($\mu$C/g) | Fluency (%) |
| Example 1 | Silica/titania | 4.0 | 181 | −140 | 82 |
| Example 2 | Silica/titania | 18.2 | 156 | −92 | 75 |
| Example 3 | Silica/titania | 3.2 | 183 | −153 | 80 |
| Comparative example 1 | Silica/titania | 1.0 | 174 | −450 | 81 |
| Comparative example 2 | Silica/titania | 19.0 | 65 | −250 | 55 |
| Comparative example 3 | Silica/titania | 20.0 | 180 | −520 | 72 |
| Comparative example 4 | Silica/titania | 0.2 | 0.1 | −460 | 24 |
| Comparative example 8 | Silica | 0 | 200 | −540 | 82 |
| Comparative example 9 | titania | 0 | 95 | −55 | 65 |

As is obvious from Table 3, the absolute charge quantity of the oxide powder was large (250 to 540 $\mu$C/g) in Comparative examples 1 to 4, and 8, while it was small (92 to 153 $\mu$C/g) in Examples 1 to 3. The fluidity of the oxide powder was small (55 and 24%) in Comparative examples 2 and 4, respectively, while it was large (75 to 82%) in Examples 1 to 3.

<Comparative Test 3 and Its Evaluation>

The oxide powders of Examples 10 to 12, and Comparative examples 9 and 10 were tested, for the content of the coating layer, the specific surface area, the photo-catalytic activity, and the UV absorption in the oxide powder. The results are shown in Table 4.

The content of the coating layer and the specific surface area were determined as in Comparative test 1.

The photo-catalytic activity of a test oxide powder was obtained by placing 1 g of an oxide powder in a pyrex (trade name given by Corning) glass vessel (120 mm×120 mm×65 mm), adding thereto acetaldehyde gas to give a gas concentration of 4000 ppm, closing helmetically the glass vessel, radiating UV rays with an intensity of 3 mW/cm² to the vessel for one hour, and measuring the concentration of acetaldehyde gas with a gas-tech detection tube, to determine by calculation the decomposition of acetaldehyde.

The UV absorption of a test oxide powder was obtained by adding 3 g of an oxide powder to 97 g of isopropylpalmitate, dispersing the powder into the latter with a dissolver at 2000 rpm for five minutes, placing this dispersion liquid in a cell having a thickness of 10 $\mu$m, and measuring the absorption at 300 nm.

TABLE 4

| | | Oxide powder | | | |
|---|---|---|---|---|---|
| | | Content | | Test item | |
| | Powder matrix/ coating layer | of coating layer (%) | Specific surface area (m²/g) | Photo-catalytic activity (%) | UV absorption (%) |
| Example 10 | Titania/silica | 4.0 | 80 | 16 | 85 |
| Example 11 | Titania/alumina | 3.1 | 78 | 19 | 85 |
| Example 12 | Titania/iron oxide | 6.8 | 75 | 12 | 86 |
| Comparative example 9 | Titania | 0 | 95 | 100 | 87 |
| Comparative example 10 | Titania/Silica (mixture) | 16.7 | 190 | 100 | 85 |

As is obvious from Table 4, acetaldehyde gas was completely decomposed in Comparative examples 9 and 10, while it was hardly decomposed (12 to 19%) in Examples 10 to 12. It was found from this that the photo-catalytic activity was more effectively inhibited in Examples 10 to 12 than in Comparative examples 9 and 10. The UV absorption of Comparative examples 9 and 10 was 87 and 85%, respectively, while the same was 85 to 86% in Examples 10 to 12, both being practically the same. As a result, the oxidation catalyzing powder of Examples proved to be more suitable as a material of cosmetics than those of Comparative examples.

<Comparative Test 4 and Its Evaluation>

The oxide powders of Examples 2 and 13, and Comparative examples 8, 9 and 11 were tested, for the content of the coating layer, the specific surface area, and the electric resistance in the oxide powder. The results are shown in Table 5.

The content of the coating layer and the specific surface area were determined as in Comparative test 1.

The electric resistance of a test oxide powder was determined with an electric resistance meter (Hirester, Mitsubishi Chemical). Specifically, the electric resistance of a test oxide powder was obtained by placing 0.3 g of an oxide powder in a specified cell, applying a pressure of 10 MPa to the cell, and measuring the electric resistance of this pressurized powder body.

TABLE 5

| | | Oxide powder | | |
|---|---|---|---|---|
| | Powder matrix/ coating layer | Content of coating layer (%) | Specific surface area (m²/g) | Test item Electric resistance (Ω.cm) |
| Example 2 | Silica/titania | 18.2 | 156 | $1 \times 10^9$ |
| Example 13 | Silica/ATO | 7.2 | 165 | $1 \times 10^8$ |
| Comparative example 8 | Silica | 0 | 200 | $1 \times 10^{14}$ |
| Comparative Example 9 | Titania | 0 | 95 | $1 \times 10^6$ |
| Comparative example 11 | ATO | 0 | 100 | 1 |

As is obvious from Table 5, the electric resistance of Comparative example 8 was high ($1 \times 10^{14}$ Ů.cm) while those of Examples 2 and 13 were low ($1 \times 10^9$ and $1 \times 10^8$ Ů.cm), respectively. The oxide powders of Examples 2 and 13 had a larger specific surface area than did the titania powder of Comparative example 9 and the ATO powder of Comparative example 11. As a result, application of a dispersion liquid containing an oxide powder from the Examples to glass or film will provide it with a high transparency.

<Comparative Test 5 and Its Evaluation>

The oxide powders of Examples 1, 6 and 17, and Comparative examples 1, 8, 12 and 14 were tested, for the content of the coating layer, the specific surface area, the adsorption D (%) of anion to the oxide powder (the powder coated by the coating layer), the adsorption E (%) of anion to the powder matrix and the transparency of the oxide powder. The results are shown in Table 6.

The content of the coating layer and the specific surface area were determined as in Comparative test 1.

The absorbed anion species in Table 6 represent reagents which were used to determine the anion adsorptions D (%) and E (%).

The adsorption of anion was determined as follows.

100 ml of an aqueous solution of sodium benzenesulfonate at 2.5 mmol/l was placed in a beaker having a volume of 200 ml; a stirring aid was introduced in the beaker and the beaker was placed on a stirrer, and the solution was stirred by means of the stirring aid; while the solution being stirred, 2 g of a surface reformed silica was weighed and transferred into the solution to be dispersed therein; after stirring for five minutes, a syringe incorporating a syring filter of 0.45 μm was used to filtrate the solution; 1 ml or more of the filtrate was sampled in a sampling bottle having a volume of 4 ml; 1 ml of the solution was precisely sampled with a volumetric pipette and transferred into a volumetric flask; and the solution was diluted with pure water to 100 ml.

A spectrophotometer (V-570, Japan Spectrophotometry) was taken, and a pair of quartz cells were balanced 100% using pure water on the meter; pure water was poured into one quartz cell to serve as a reference, and the above diluted solution was put into the other cell for test; a beam with a wavelength of 220.8 nm was applied to the cells, and the transmission X was determined. The transmission X was put in the following formula (6) to obtain the molar concentration Y (mmol) of sodium benzensulfonate in the initial sample solution.

$$Y = -0.0432 \times In(X) + 0.1976 \ldots \quad (6)$$

The adsorption to silica Z (mmol) was obtained by the formula Z=0.025−Y, and expressed as percentage (%). Further, the anion absorptions D and E obtained from the above measurement were used to derive the ratio D/E. Even if sodium benzensulfonate is substituted for sodium p-toluenesulfonate, it will be possible to similarly obtain the anion adsorption.

The transparency was determined as follows. Firstly, 120 g of an oxide powder, 12 g of a dispersant (AM-2150, Japan Surfactant Industrial Co.), 35 ml ethanol, 10 ml n-propanol, 5 ml ethyl acetate, and 12 g of polyvinyl alcohol (PVA235, KURARE) were dispersed using a homogenizer to produce an ink-receiving layer forming material. This ink-receiving layer forming material was applied by a barcoder method on a sheet of OHP film. After application, the coat was dried being exposed to a jet of warm air of 50° C. for three minutes. The coat layer after drying was 30 μm in thickness. Then, the spectrophotometer (V-570, Japan Spectrophotometry) was taken; a sheet of OHP film having no coat of the ink-receiving layer forming material was inserted into one cell to serve as a reference, and another sheet of OHP film having received a coat of the ink-receiving layer forming material was inserted into the other cell; and a beam with a wavelength of 500 nm was applied to the cells, and the transparency was determined based on the transmission.

TABLE 6

| | | Oxide powder | | | | | |
|---|---|---|---|---|---|---|---|
| | | Content | Specific | Anion | Test item | | |
| | Powder matrix/ coating layer | Of coating layer (%) | surface area (m²/g) | adsorbing species | D/E (%/%) | Ratio (%) | Transparency (%) |
| Example 1 | Silica/titania | 4.0 | 181 | sodium p-toluenesulfonate | 22/12 | 183 | 90 |
| Example 6 | Silica/alumina | 28.0 | 348 | sodium benzenesulfonate | 68/19 | 358 | 93 |
| Example 17 | Silica/Zirconia | 7.3 | 171 | sodium benzenesulfonate | 24/10 | 240 | 91 |
| Comparative example 1 | Silica/titania | 1.0 1.0 | 174 174 | sodium p-toluenesulfonate | 14/12 | 117 | 91 |
| Comparative example 8 | Silica | — | 200 | sodium p-toluenesulfonate | 12/12 | 100 | 95 |

TABLE 6-continued

|  | | Oxide powder | | | | |
|---|---|---|---|---|---|---|
|  | | Content | Specific | Anion | Test item | | |
|  | Powder matrix/ coating layer | Of coating layer (%) | surface area (m²/g) | adsorbing species | D/E (%/%) | Ratio (%) | Transparency (%) |
| Comparative example 12 | Silica/alumina | 0.9 | 177 | sodium benzenesulfonate | 14/10 | 140 | 94 |
| Comparative example 14 | Alumina | — | 100 | sodium benzenesulfonate | 17/17 | 100 | 80 |

As is obvious from Table 6, the ratio D/E was low (117 and 140%) in Comparative examples 1 and 12 while it was high (183 to 358%) in Examples 1, 6 and 17. As a result, the product of this invention proved to have an excellent anion adsorption, and thus to be suitable as a material for forming the ink receiving layer. Although Comparative examples 8 and 12 presented a good transparency, they were low in anion adsorption. Comparative example 14 presented a poor transparency. In contrast, Examples 1, 6 and 17 were excellent in transparency and anion adsorption.

<Comparative Test 6 and Its Evaluation>

The oxide powders of Examples 7, 8, 18, and 1 to 3, Comparative examples 13 to 15 were tested, for the content of the coating layer, and the specific surface area in the oxide powder. In addition, the abrasive agent made of the test oxide powder was applied to a test piece, and the wear speed and the surface condition of the test piece was determined. The results are shown in Table 3.

The content of the coating layer and the specific surface area were determined as in Comparative test 1.

The wear speed was determined as follows. Firstly, an aqueous dispersion liquid containing 5 wt % test abrasive agent was prepared; and an oxidizing agent was added to this aqueous dispersion liquid, to produce a slurry for chemical/mechanical abrasion. Then, this slurry was applied to a SUBA500/SUBA IV pad stack (Rodel), and a tungsten wafer was abraded chemically as well as mechanically on this machine. The machine was set with ISPEC/WESTECH472CMP tools to give a slurry flow rate of 150 cc/min, a table turn speed of 60 rpm, and a spindle speed of 60 rpm. Under this condition, abrasion proceeded continuously for 10 minutes, and the reduction in the thickness of the wafer after abrasion was used to obtain the wear speed.

Moreover, the surface condition of the abraded test piece was visually evaluated: if the surface presented a mirror-polish, it was evaluated as good, while it gave a frosted appearance on its part, it was evaluated as poor.

TABLE 7

|  | | Oxide powder | | | |
|---|---|---|---|---|---|
|  | | Content | Specific surface | Test item | |
|  | Powder matrix/ coating layer | of Coating Layer (%) | area (m²/g) | Wear speed (Å/min) | Surface condition |
| Example 7 | Silica/alumina | 9.1 | 177 | 2700 | Good |
| Example 18 | Silica/alumina | 1.1 | 48 | 4200 | Good |
| Example 19 | Silica/ceria | 4.0 | 83 | 4000 | Good |
| Comparative example 13 | Silica | — | 50 | 900 | Good |
| Comparative example 14 | Alumina | — | 100 | 4500 | Poor |

TABLE 7-continued

|  | | Oxide powder | | | |
|---|---|---|---|---|---|
|  | | Content | Specific surface | Test item | |
|  | Powder matrix/ coating layer | of Coating Layer (%) | area (m²/g) | Wear speed (Å/min) | Surface condition |
| Comparative example 15 | Silica/alumina (mixture) | — | 92 | 1200 | Poor |

As is obvious from Table 7, the abrasion speed of the abrasive agents incorporating the oxide powders of Comparative examples 13 and 15 was small (900 and 1200 Å/min) while the same was large (2700 to 4200 Å/min) in the abrasive agents prepared from the oxide powders of Examples 7, 18 and 19. The surface of the test piece after being abraded with the abrasive prepared from the oxide powder of Comparative examples 14 and 15 gave a frosted appearance on its parts, while the surface of the test piece abraded with the abrasive prepared from the oxide powders of Examples 7, 18 and 19 gave a mirror-polish.

<Comparative Test 7 and Its Evaluation>

The ink-jet oriented print materials of Example 20 and Comparative example 16 had letters printed thereupon with an ink-jet printer (BJF-600J, Canon), and the letters were visually inspected whether there were any cracks or blurs on the print coat.

It was found that, although there were ink blurs when letters were printed on the print material prepared from Comparative example 16, there were detected no ink blurs when letters were printed on the print material prepared from Example 20. No cracks were detected on the print coat in the print materials prepared from Comparative example 16 as well as from Example 20.

As described above, according to the present invention, a powder matrix is kept in a fluent state, said powder matrix consisting of a first oxide having an absorbed water amount of 0.1 to 50%, an averaged particle diameter of 0.005 to 0.5 μm and a surface hydroxyl group number of 0.1 to 25 μmol/m²; one or both of a halide and an alkoxide is allowed to contact with said powder matrix kept in the fluent state, by means of an inert carrier gas, and then they are heated at a temperature of from 25 to 800° C., to thereby coat said powder matrix by a coating layer consisting of a second oxide; and a reaction by-product consisting of one or both of a hydrogen halide or an alcohol generated by said contacting is heated at a temperature of from 200 to 1000° C. within the inert carrier gas to be thereby eliminated, which will make it possible to reduce the production cost of the oxide powder and to uniformly form the coating layer on the surface of the powder matrix.

With a powder matrix kept in a fluent state, one or both of a halide and an alkoxide is allowed to contact, by means of an inert carrier gas, and then they are heated at a temperature of from 25 to 800° C., to thereby coat said powder matrix by a coating layer consisting of a second oxide; and a reaction by-product consisting of a hydrogen halide generated by said contacting is heated at a temperature of from 200 to 1000° C. in the atmosphere to be thereby eliminated, which will ensure the same advantages as above. If the powder matrix is silica, alumina or titania, and the metal element included in a halide or an alkoxide is one or two or more of elements selected from the group consisting of transition elements of the 3A, 4A, 5A, 6A, 7A, 8, 1B and 2B families and typical elements of the 3B, 4B and 5B families in the periodic table, the resulting oxide powder will markedly ensure the aforementioned advantages.

If an oxide powder having an averaged particle diameter of 0.006 to 0.5 μm, comprising a powder matrix consisting of a first oxide having an averaged particle diameter of 0.005 to 0.5 μm, and a coating layer coating the surface of said powder matrix, said coating layer consisting of a second oxide identical with or different from said first oxide, wherein said second oxide of said coating layer is chemically bonded to the surface of said first oxide of said powder matrix, and the surface of said powder matrix is uniformly coated by the coating layer by 60% or more, the physical and chemical characteristics of the powder matrix and the coating layer will develop satisfactorily.

For example, said oxide powder is added to a slurry for chemical/mechanical abrasion to serve as an abrasive agent, it will provide the chemical/mechanical abrasive with a high speed abrasion activity and mirror-polishing activity at the same time; and if said oxide powder is added to an ink-jet oriented print material as an ink receiving layer forming material, it will provide the ink-jet oriented print material with an excellent printing activity capable of inhibiting the development of cracks on the surface coat and ink blurring. Further, if said oxide powder is added as an additive to a toner for electronic photography, it will provide the toner with fluency and charge stability at the same time; if said oxide powder is added to a cosmetic as a UV absorbing agent, it will provide the cosmetic with a UV absorbing activity and photo-catalytic activity at the same time; and if said oxide powder is added to an electro-conductive coating agent as an electro-conductive powder, it will provide the electro-conductive coat with electro-conductivity.

If said powder matrix has an absorbed water amount of 0.1 to 50%, and a surface hydroxyl group number of 0.1 to 25 μmol/m², and the coated amount by said coating layer is 0.1 to 10 times the surface hydroxyl group number, it will markedly ensure the aforementioned advantages. Furthermore, if the powder matrix is silica, alumina or titania, and the metal element included in a halide or an alkoxide is one or two or more of elements selected from the group consisting of transition elements of the 3A, 4A, 5A, 6A, 7A, 8, 1B and 2B families and typical elements of the 3B, 4B and 5B families in the periodic table, the resulting oxide powder will more markedly ensure the aforementioned advantages.

INDUSTRIAL APPLICABILITY

The oxide powder of the present invention can be utilized for the manufacture of various products such as abrasive agents, silica slurry, chemical/mechanical abrasion slurry, ink receiving layer forming materials, ink-jet oriented print materials, additives for toner, UV absorbing agents, electro-conductive powders, etc.

What is claimed is:

1. A manufacturing method of an oxide powder comprising the steps of:
   keeping a powder matrix in a fluent state, said powder matrix consisting of a first oxide composed of one or both of a metal oxide and a semi-metal oxide, or a composite or mixed oxide from those oxides, and having an absorbed water amount of 0.1 to 50%, an averaged particle diameter of 0.005 to 0.5 μm and a surface hydroxyl group number of 0.1 to 25 μmol/m²;
   contacting, one or both of a halide and an alkoxide including metal or semi-metal identical with or different from the metal or semi-metal constituting said first oxide, with said powder matrix kept in the fluent state, by means of an inert carrier gas, and then heating them at a temperature of from 25 to 800° C., to thereby coat said powder matrix by a coating layer consisting of a second oxide; and
   heating a reaction by-product consisting of one or both of a hydrogen halide or an alcohol generated by said contacting, at a temperature of from 200 to 1000° C. within the inert carrier gas to thereby eliminate the reaction by-product.

2. A manufacturing method of an oxide powder comprising the steps of:
   keeping a powder matrix in a fluent state, said powder matrix consisting of a first oxide having an absorbed water amount of 0.1 to 50%, an averaged particle diameter of 0.005 to 0.5 μm and a surface hydroxyl group number of 0.1 to 25 μmol/m²,
   contacting, a halide including metal or semi-metal identical with or different from the metal or semi-metal constituting said first oxide, with said powder matrix kept in the fluent state, by means of an inert carrier gas, and then heating them at a temperature of from 25 to 800° C., to thereby coat said powder matrix by a coating layer consisting of a second oxide; and
   heating a reaction by-product consisting of a hydrogen halide generated by said contacting, at a temperature of from 200 to 1000° C. within the atmosphere to thereby eliminate the reaction by-product.

3. A manufacturing method of claim 1 or 2 wherein said powder matrix comprises silica, alumina or titania, or is a composite oxide or a mixed oxide comprising at least silica, alumina or titania.

4. A manufacturing method of claim 1 or 2,
   wherein the metal element included in said halide or said alkoxide is one, or two or more of elements selected from the group consisting of transition elements of the 3A, 4A, 5A, 6A, 7A, 8, 1B and 2B families and typical elements of the 3B, 4B and 5B families in the periodic table.

5. A manufacturing method of an oxide powder of claim 1 or 2,
   wherein said keeping step comprises the step of keeping, said powder matrix consisting of said first oxide having the absorbed water amount of 0.1 to 50% and the surface hydroxyl group number of 0.1 to 25 μmol/m², in the fluent state, by supplying said powder matrix to a fluidized bed reaction apparatus (11), and by circulating atmospheric air from the below through a baffle plate (24);
   wherein said contacting step comprises the steps of adopting the inert carrier gas as a fluidizing gas, and circulating one or both of the halide and the alkoxide together with the carrier gas through the powder matrix kept in the fluent state through the baffle plate (24) to thereby coat said powder matrix by the coating layer consisting of the second oxide; and wherein said heating step comprises the step of circulating the carrier gas through the baffle plate (24), to thereby eliminate the reaction by-product and to thereby discharge said powder matrix coated by said coating layer, from the fluidized bed reaction apparatus (11).

6. A manufacturing method of an oxide powder of claim 1 or 2, wherein said keeping step comprises the step of keeping, said powder matrix consisting of said first oxide having the absorbed water amount of 0.1 to 50% and the surface hydroxyl group number of 0.1 to 25 $\mu mol/m^2$, in the fluent state, by supplying said powder matrix to a fluidized bed reaction apparatus (11), and by circulating atmospheric air from the below through a baffle plate (24);

wherein said contacting step comprises the steps of adopting the inert carrier gas as a fluidizing gas, and circulating the halide together with the carrier gas through the powder matrix kept in the fluent state through the baffle plate (24) to thereby coat said powder matrix by the coating layer consisting of the second oxide; and wherein said heating step comprises the step of circulating atmospheric air through the baffle plate (24), to thereby eliminate the reaction by-product and to thereby discharge said powder matrix coated by said coating layer, from the fluidized bed reaction apparatus (11).

7. A manufacturing method of an oxide powder of claim 1 or 2, wherein a relative dispersion among elements is within ±60 when analyzing elements of a population including said oxide powder as constituent ingredients of the population; and wherein no more than one agglomerate of powder particles exists in 1000 powder particles of the population.

8. An oxide powder having an averaged particle diameter of 0.006 to 0.5 $\mu m$, comprising a powder matrix consisting of a first oxide having an averaged particle diameter of 0.005 to 0.5 $\mu m$ and composed of one or both of a metal oxide and a semi-metal oxide, or of a composite or mixed oxide from those oxides, and a coating layer coating the surface of said powder matrix, said coating layer consisting of a second oxide identical with or different from said first oxide, wherein said second oxide of said coating layer is chemically bonded to the surface of said first oxide of said powder matrix, and the surface of said first oxide of said powder matrix is uniformly coated by the coating layer by 60% or more, wherein said powder matrix has an absorbed water amount of 0.1 to 50%, and a surface hydroxyl group number of 0.1 to 25 $\mu mol/m2$, and wherein the coated amount by said coating layer is 0.1 to 10 times the surface hydroxyl group number.

9. An oxide powder of claim 8, wherein said powder matrix comprises silica, alumina or titania, or is a composite oxide or a mixed oxide comprising at least silica, alumina or titania.

10. An oxide powder of claim 8, wherein the metal element included in said second oxide of said coating layer is one or two or more of elements selected from the group consisting of transition elements of the 3A, 4A, 5A, 6A, 7A, 8, 1B and 2B families and typical elements of the 3B, 4B and 5B families in the periodic table.

11. An oxide powder of claim 8, wherein said oxide powder is provided with hydrophobicity, by surface reforming by one or both of a silane coupling agent and a silicone compound.

12. An oxide powder of claim 11, wherein the silane coupling agent is represented by the following formula (1):

$$X_{4-n}SiR_n \ldots \qquad (1)$$

wherein

X is any one of a hydroxyl group, an alkoxy group and a halogen atom, R is an alkyl group having 1 to 18 carbons, and n is an integer from 0 to 3.

13. An oxide powder of claim 11, wherein the silane coupling agent is represented by the following formula (2):

$$R_3SiNHSiR_3 \ldots \qquad (2)$$

wherein

R is an alkyl group having 1 to 18 carbons.

14. An oxide powder of claim 11, wherein the silicone compound is represented by the following formula (3):

wherein the substitutional group represented by R' is any one of a methyl group and an ethyl group;

R" is any one of a methyl group, an ethyl group and a hydrogen atom, or is an alkyl group including, as a part thereof, any one of a vinyl group, a phenyl group and an amino group, X is any one of a hydroxyl group, an alkoxy group, a halogen atom and an alkyl group, and m is an integer from 1 to 500.

15. An oxide powder of claim 10, wherein said oxide powder comprises the first oxide constituting a powder matrix which is a composite oxide or a mixed oxide including silica, or including at least silica; and the second oxide constituting the coating layer including a metal element.

16. An oxide powder of claim 15, wherein the second oxide constituting the coating layer is alumina, titania, zirconia or ceria.

17. An abrasive agent comprising an oxide powder of claim 16.

18. A slurry for chemical/mechanical abrasion comprising an abrasive agent of claim 17.

19. An oxide powder of claim 16, wherein the adsorbed amount of an anion-source compound to said oxide powder is 150% or more than the adsorbed amount of said anion-source compound to the powder matrix.

20. An ink-receiving layer forming material comprising an oxide powder of claim 19.

21. An ink-jet oriented print material obtained by coating and drying a slurry of said ink-receiving layer forming material of claim 20.

22. A toner oriented additive comprising said oxide powder of claim 11 wherein said first oxide of said powder matrix is silica, and the second oxide of said coating layer is titania.

23. An ultraviolet ray absorbing material comprising an oxide powder of claim 8 wherein said first oxide of said powder matrix is titania, and said second oxide of said coating layer is any one of silica, alumina and iron oxide.

24. An electrically conductive powder comprising an oxide powder of claim 8, wherein said first oxide of said powder matrix is silica, and said second oxide of said coating layer is titania, or antimony-doped stannic oxide.

25. An oxide powder of claim 9,
wherein the metal element included in said second oxide of said coating layer is one or two or more of elements selected from the group consisting of transition elements of the 3A, 4A, 5A, 6A, 7A, 8, 1B and 2B families and typical elements of the 3B, 4B and 5B families in the periodic table.

26. An oxide powder of any one of claims 9,
wherein said oxide powder is provided with hydrophobicity, by surface reforming by one or both of a silane coupling agent and a silicone compound.

27. An oxide powder of any one of claims 10,
wherein said oxide powder is provided with hydrophobicity, by surface reforming by one or both of a silane coupling agent and a silicone compound.

28. A toner oriented additive comprising said oxide powder of claim 12 wherein said first oxide of said powder matrix is silica, and the second oxide of said coating layer is titania.

29. A toner oriented additive comprising said oxide powder of claim 13 wherein said first oxide of said powder matrix is silica, and the second oxide of said coating layer is titania.

30. A toner oriented additive comprising said oxide powder of claim 14 wherein said first oxide of said powder matrix is silica, and the second oxide of said coating layer is titania.

31. An ultraviolet ray absorbing material comprising an oxide powder of claim 9 wherein said first oxide of said powder matrix is titania, and said second oxide of said coating layer is any one of silica, alumina and iron oxide.

32. An ultraviolet ray absorbing material comprising an oxide powder of claim 10 wherein said first oxide of said powder matrix is titania, and said second oxide of said coating layer is any one of silica, alumina and iron oxide.

33. An electrically conductive powder comprising an oxide powder of claim 9 wherein said first oxide of said powder matrix is silica, and said second oxide of said coating layer is titania, or antimony-doped stannic oxide.

34. An electrically conductive powder comprising an oxide powder of claim 10 wherein said first oxide of said powder matrix is silica, and said second oxide of said coating layer is titania, or antimony-doped stannic oxide.

* * * * *